United States Patent
Tanaka et al.

(10) Patent No.: US 9,550,448 B2
(45) Date of Patent: Jan. 24, 2017

(54) LIGHT DISTRIBUTION CONTROL METHOD AND LIGHT DISTRIBUTION CONTROL DEVICE FOR A VEHICULAR HEADLAMP

(71) Applicant: KOITO MANUFACTURING CO., LTD., Tokyo (JP)

(72) Inventors: Hidetada Tanaka, Shizuoka (JP); Takeshi Masuda, Shizuoka (JP); Motohiro Komatsu, Shizuoka (JP); Takao Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/903,773

(22) PCT Filed: Jul. 9, 2014

(86) PCT No.: PCT/JP2014/068282
§ 371 (c)(1),
(2) Date: Jan. 8, 2016

(87) PCT Pub. No.: WO2015/005377
PCT Pub. Date: Jan. 15, 2015

(65) Prior Publication Data
US 2016/0167566 A1   Jun. 16, 2016

(30) Foreign Application Priority Data

Jul. 11, 2013  (JP) ................................. 2013-145109
Jul. 11, 2013  (JP) ................................. 2013-145110
Jul. 11, 2013  (JP) ................................. 2013-145111

(51) Int. Cl.
*B60Q 1/02*   (2006.01)
*B60Q 1/14*   (2006.01)
(Continued)

(52) U.S. Cl.
CPC ............. *B60Q 1/1423* (2013.01); *B60Q 1/143* (2013.01); *F21S 48/1154* (2013.01);
(Continued)

(58) Field of Classification Search
CPC ............. B60Q 1/04; B60Q 1/045; B60Q 1/14; B60Q 1/1423
(Continued)

(56) References Cited

U.S. PATENT DOCUMENTS 7,824,086 B2 * 11/2010 Yamamura ........... F21S 48/1159
                                                           362/509
8,892,301 B2 * 11/2014 Park ........................ B60Q 1/08
                                                           362/459
(Continued)

FOREIGN PATENT DOCUMENTS

DE  10 2011 050 535 A1   11/2012
EP       2 281 719 A1     2/2011
(Continued)

OTHER PUBLICATIONS

Int. Search Report dated Sep. 30, 2014 issued in Int. Application No. PCT/JP2014/068282 (PCT/ISA/210).
(Continued)

*Primary Examiner* — Jason M Crawford
(74) *Attorney, Agent, or Firm* — Sughrue Mion, PLLC

(57) ABSTRACT

The invention relates to a light distribution control method and a light distribution control device in which plural illumination regions are arranged in the left-right direction and illuminated by a headlamp in an ADB light distribution pattern, and vehicle positions of a vehicle ahead are detected and selected ones of the plural illumination regions are reduced in light quantity according to the detected vehicle positions. In this method and device, corrected vehicle positions are set that are obtained by adding margins to the
(Continued)

detected vehicle positions in the left and right directions, respectively, and compared with the plural illumination regions. Illumination regions where the vehicle ahead exists are reduced in light quantity.

16 Claims, 27 Drawing Sheets

(51) Int. Cl.
F21S 8/10 (2006.01)
B60Q 1/38 (2006.01)
(52) U.S. Cl.
CPC ....... *F21S 48/1258* (2013.01); *F21S 48/1747* (2013.01); *B60Q 1/38* (2013.01); *B60Q 2300/054* (2013.01); *B60Q 2300/056* (2013.01); *B60Q 2300/332* (2013.01); *B60Q 2300/336* (2013.01); *B60Q 2300/41* (2013.01); *B60Q 2300/42* (2013.01); *B60Q 2300/45* (2013.01)
(58) Field of Classification Search
USPC ... 315/76–77, 82; 701/36, 49; 362/459–460, 362/465–466
See application file for complete search history.

(56) References Cited

U.S. PATENT DOCUMENTS

| | | | | |
|---|---|---|---|---|
| 2008/0130302 A1* | 6/2008 | Watanabe | ............... | B60Q 1/085 362/466 |
| 2009/0043458 A1* | 2/2009 | Kamioka | ............... | B60Q 1/085 701/49 |
| 2009/0279317 A1* | 11/2009 | Tatara | ............... | B60Q 1/12 362/465 |
| 2011/0012510 A1* | 1/2011 | Tani | ............... | B60Q 1/1423 315/82 |
| 2011/0267455 A1* | 11/2011 | Gotz | ............... | B60Q 1/085 348/135 |
| 2012/0051071 A1* | 3/2012 | Okubo | ............... | F21S 48/1159 362/465 |
| 2012/0206043 A1* | 8/2012 | Yamazaki | ............... | B60Q 1/143 315/82 |
| 2013/0218413 A1* | 8/2013 | Tanaka | ............... | B60Q 1/143 701/36 |
| 2013/0242100 A1* | 9/2013 | Seki | ............... | B60Q 1/04 348/148 |
| 2013/0279186 A1* | 10/2013 | Okamoto | ............... | F21S 48/1742 362/466 |
| 2014/0355280 A1* | 12/2014 | Fujiyoshi | ............... | B60Q 1/143 362/465 |
| 2015/0028742 A1* | 1/2015 | Imaeda | ............... | B60Q 1/143 315/82 |
| 2015/0149045 A1* | 5/2015 | Mizuno | ............... | B60Q 1/1423 701/49 |
| 2015/0246633 A1* | 9/2015 | Futamura | ............... | B60Q 1/143 362/466 |

FOREIGN PATENT DOCUMENTS

| | | |
|---|---|---|
| EP | 2 495 128 A2 | 9/2012 |
| JP | 2009-184642 A | 8/2009 |
| JP | 2009-220649 A | 10/2009 |
| JP | 2011-20559 A | 2/2011 |
| JP | 2011-31807 A | 2/2011 |
| JP | 2012-162105 A | 8/2012 |
| JP | 2012-166633 A | 9/2012 |
| JP | 2012-183875 A | 9/2012 |
| JP | 2013-54993 A | 3/2013 |
| JP | 2013-79044 A | 5/2013 |
| JP | 2014-40140 A | 3/2014 |
| WO | 2012/063365 A1 | 5/2012 |
| WO | 2013/080363 A1 | 6/2013 |

OTHER PUBLICATIONS

Written Opinion dated Sep. 30, 2014 issued in Int. Application No. PCT/JP2014/068282 (PCT/ISA/237).

\* cited by examiner

LIGHT DISTRIBUTION CONTROL METHOD AND LIGHT DISTRIBUTION CONTROL DEVICE FOR A VEHICULAR HEADLAMP

TECHNICAL FIELD

The present invention relates to a technique for controlling the light distribution of a vehicular headlamp, and more particularly, to a light distribution control method and a light distribution control device for a vehicular headlamp that can be subjected to ADB (adaptive driving beam) light distribution control.

BACKGROUND ART

ADB light distribution control has been proposed as one technique for producing a light distribution for preventing dazzling of the driver etc. of a vehicle(s) (hereinafter referred to "vehicle(s) ahead") located in a region ahead of the self vehicle, such as a forward vehicle running in the same direction or an oncoming vehicle, while enhancing the effect of illumination of the region ahead of the self vehicle. In the ADB light distribution control, a vehicle ahead is detected by a vehicle position detecting device and a control is performed to reduce (to zero if necessary) the light quantity in a region where the detected vehicle ahead exists and illuminate the other wide regions brightly. In recent years, ADB light distribution control has come to be applied to headlamps having such light-emitting elements as LEDs as light sources. In the ADB light distribution control using LEDs, a light distribution for illuminating a region ahead of the self vehicle brightly is formed by combining respective illumination regions of plural LEDs as light sources and, if a vehicle ahead is detected, the light quantity is reduced (to zero if necessary) in illumination regions corresponding to the detected vehicle ahead. In the following description, reducing the light quantity of illumination regions will be referred to as "light quantity reduction" in a sense that it includes reduction to zero.

In the above-described ADB light distribution control, if there occurs a deviation between a position of a vehicle ahead detected by the vehicle position detecting device and actual illumination regions in which the headlamp light quantity is reduced, the vehicle ahead may be illuminated with light to dazzling its driver etc. Or the light quantity may be reduced in an unnecessarily large region to lower the visibility of a region ahead. In particular, systems that perform an ADB light distribution control are associated with various kinds of errors such as an attachment position error of the vehicle position detecting device for detecting a vehicle ahead, a calculation error occurring in detecting a vehicle position by the vehicle position detecting device, and an illumination region setting error that is associated with an error of setting of the lamp optical axis of the headlamp. This makes it difficult to completely eliminate the deviation between a detected position of a vehicle ahead and illumination regions of the headlamp. To solve this problem, Patent document 1 proposes a technique that prevents dazzling of the driver etc. of a vehicle ahead that is caused by an error between a detected position of a vehicle ahead and illumination regions by setting detection margins for detection of a vehicle ahead and giving redundancy to a detection output using the detection margins.

In Patent document 2, plural LEDs are arranged as light sources in each of left and right headlamps. Each headlamp forms plural illumination regions arranged in the horizontal direction (left-right direction) by means of the plural LEDs, and a prescribed light distribution pattern is formed by these plural illumination regions combined. When a vehicle ahead has been detected, in each headlamp LEDs to be lit or not to be lit are changed according to a movement of the vehicle ahead. In this manner, even if a vehicle ahead is moving, illumination regions where the vehicle ahead exists is rendered in a non-illuminated state to prevent dazzling of the driver etc. of the vehicle ahead. On the other hand, regions where the vehicle ahead does not exist is illuminated to increase the visibility of a region ahead of the self vehicle.

In vehicles, in particular, automobiles, that employ ADB light distribution control, in many cases the vehicle position detecting device is installed at the center in the width direction of the vehicle body of the automobile whereas the left and right headlamps are disposed at front-left and front-right positions of the automobile. Therefore, there exists an angular deviation called a parallax angle between an angle (hereinafter referred to as a "detection angle") that is formed when a vehicle ahead is viewed from the vehicle position detecting device and an angle (hereinafter referred to as an "illumination angle") of the lamp optical axis of illumination of a vehicle ahead with illumination light emitted from the left or right headlamp. Because of the presence of the parallax angle, even if a vehicle ahead is detected with high accuracy, light quantity reduction regions of the left and right headlamps cannot be positioned correctly with respect to the vehicle ahead, possibly resulting in dazzling of the driver etc. of the vehicle ahead. To prevent dazzling of the driver etc. of a vehicle ahead due to this angular deviation, Patent document 3 proposes a technique that controls the illumination angles of the left and right headlamps by calculating a parallax angle on the basis of a distance to a vehicle ahead (intervehicle distance) and a vehicle width and corrects a detected angle for the parallax angle.

PRIOR ART DOCUMENTS

Patent Documents

Patent document 1: JP-A-2009-220649
Patent document 2: JP-A-2013-54993
Patent document 3: JP-A-2012-162105

SUMMARY OF THE INVENTION

Problems to be Solved by the Invention

In the technique of Patent document 1, a margin is set for each illumination region as a detection margin to be used in determining illumination regions where a vehicle ahead concerned exists by detecting a vehicle position. Therefore, in determining illumination regions, it is necessary to perform processing using a detected position by referring to respective margins of plural illumination regions. This requires complex processing of setting a margin for each illumination region. This processing is even complex particularly in Patent document 1 because first and second margins are set for each illumination region. It is also proposed to vary the margin width according to the variation rate of the detected position of a detected vehicle ahead. However, in this case, it is necessary to vary each margin for each of plural illumination regions and processing that needs to be performed for this purpose is also complex. For the above reasons, in the technique of Patent document 1, it takes long time to determine illumination regions. As such, the technique of Patent document 1 has problems that need to be solved in realizing an ADB light distribution control that is high in response speed and prevents dazzling of the driver etc. of a vehicle ahead existing in determined illumination regions by reducing the light quantity there.

One object of the present invention is to provide a light distribution control method and a light distribution control device that can perform an ADB light distribution control that is high in response speed by simplifying the processing of the ADB light distribution control for detecting a vehicle ahead, determining illumination regions for it, and reducing the light quantity in the determined illumination regions.

In the technique of Patent document 2, an abrupt light quantity variation in illumination regions is avoided to prevent occurrence of an uncomfortable feeling when the illuminations are switched between a non-illuminated state and an illuminated state. When each illumination region is rendered in an illuminated state (i.e., it is illuminated), it is illuminated at a prescribed luminous intensity, that is, at a constant luminous intensity. Therefore, where the luminous intensity of each illumination region is high, even if illumination regions where a vehicle ahead exists are rendered in a non-illuminated state, the driver etc. of the vehicle ahead may be dazzled when part of light leaks from a certain adjacent illumination region being illuminated s into the vehicle ahead. Particularly in the case where the luminous intensity of each illumination region is set high, the driver etc. of an oncoming vehicle are prone to be dazzled and hence it is necessary to set, with a large margin, wide illumination regions to be rendered in a non-illuminated state, which lowers the visibility of a region ahead of the self vehicle. On the other hand, although setting the luminous intensity of each illumination region low is effective in preventing dazzling of the driver etc. of a vehicle ahead, the luminous intensity of the entire light illumination pattern which is a combination of illumination regions being illuminated becomes low, resulting in lowering of the forward visibility. In particular, if the luminous intensity of each illumination region is set low though an allowable maximum luminous intensity that does not cause dazzling of driver etc. of a vehicle ahead is high, the luminous intensity of the illumination region concerned is made unnecessarily low, which lowers the visibility of a region ahead of the self vehicle.

Another object of the invention is to provide a light distribution control device for a vehicular headlamp that is increased in the visibility of a region ahead while preventing dazzling of the driver etc. of a vehicle ahead.

In the technique of Patent document 3, to obtain a parallax angle for correction-controlling the illumination angle of the left or right headlamp, it is necessary to measure a vehicle width of a vehicle ahead and an intervehicle distance. Whereas measurement of a vehicle width is less problematic because the vehicle widths of most of vehicles are around 2 m, the intervehicle distance varies to a large extent from several meters (in the case where a vehicle exits immediately ahead of the self vehicle) to about 100 m (in the case where a vehicle exists at a distant place ahead). Therefore, the parallax angle varies depending on the intervehicle distance; if a parallax angle is not set properly, the effect of preventing dazzling of the driver etc. of a vehicle ahead may not be obtained. Particularly in a situation that a vehicle ahead is far from the self vehicle and hence has a long intervehicle distance, the parallax angle is smaller than in a situation of a short intervehicle distance. In this case, a fine correction control is necessary and dazzling tends to occur. Furthermore, since measurement of an intervehicle distance requires a special device or control, an automobile that is not equipped with this kind of device cannot obtain a proper parallax angle calculated on the basis of an intervehicle distance and has difficulty preventing dazzling of the driver etc. of a vehicle ahead reliably.

A further object of the invention is to provide a light distribution control device capable of preventing dazzling of the driver etc. of a vehicle ahead reliably by controlling the light distribution of a headlamp properly.

Means for Solving the Problems

One embodiment of the present invention is a light distribution control method for a vehicular headlamp. In the light distribution control method, plural illumination regions are arranged in the left-right direction and illuminated by a headlamp in a desired light distribution pattern, and vehicle positions of a vehicle ahead are detected and selected ones of the plural illumination regions are reduced in light quantity according to the detected vehicle positions, wherein corrected vehicle positions are set that are obtained by adding margins to the detected vehicle positions in the left and right directions, respectively, illumination regions where the vehicle ahead exists are detected on the basis of the corrected vehicle positions, and the detected illumination regions are reduced in light quantity.

Another embodiment of the present invention is a light distribution control device for a vehicular headlamp. The light distribution control device comprises a headlamp which illuminates, in a desired light distribution pattern, plural illumination regions arranged in the left-right direction for illumination of a region ahead, vehicle ahead detector which detects vehicle positions of a vehicle ahead, and light distribution controller which reduces selected ones of the plural illumination regions in light quantity according to the detected vehicle positions. In the light distribution control device, the light distribution controller detects illumination regions where the vehicle ahead exists on the basis of the detected vehicle positions and reduces the detected illumination regions in light quantity.

In the light distribution control device, it is preferable that the light distribution controller detects position variations of the vehicle positions, and increases or decreases the margins according to temporal variation rates of the position variations. For example, the light distribution controller increases a margin in a direction in which the vehicle positions vary as the variation rates of the position variations increase. Additionally, it is preferable that the light distribution controller increases the margins quickly and decreases the margins slowly.

Another embodiment of the present invention is a light distribution control device for a vehicular headlamp. The light distribution control device comprises a headlamp which illuminates, in a desired light distribution pattern, plural illumination regions arranged in the left-right direction, vehicle ahead detector which detects a vehicle ahead, and light distribution controller which reduces selected ones of the plural illumination regions in light quantity according to the detected vehicle positions. In the light distribution control device, the light distribution controller is configured so as to be able to set boundary positions of each of the plural illumination regions at different positions according to a type of the detected vehicle ahead on the basis of a luminous intensity distribution of each of the plural illumination regions. In the light distribution control device, it is preferable that the light distribution controller detects whether the vehicle ahead is a forward vehicle running in the same direction or an ongoing vehicle, and sets the boundary positions at different positions depending on whether the vehicle ahead is a forward vehicle running in the same direction or an ongoing vehicle.

In the light distribution control device, it is preferable that the light distribution controller performs a control of increasing the luminous intensity of other illumination regions when reducing part of the plural illumination regions in light quantity. In this case, the light distribution controller increases the luminous intensity using electric energy saved by the reduction in light quantity. Also, it is preferable that the light distribution controller increases or decreases the luminous intensity of illumination regions that are adjacent to the light-quantity-reduced illumination regions. Moreover, it is preferable that the light distribution controller varies, periodically, the luminous intensity of a left or right end illumination region of the plural illumination regions and an illumination region or regions neighboring it.

Another embodiment of the present invention is a light distribution control device for a vehicular headlamp. The light distribution control device comprises a headlamp disposed in at least a portion, in the vehicle width direction, of a vehicle, vehicle detector which is disposed at a different position in the vehicle width direction than the headlamp and detects a vehicle ahead, and light distribution controller which controls a light distribution of the headlamp on the basis of a vehicle position of the detected vehicle ahead. In the light distribution control device, the light distribution controller is configured so as to be able to perform a light distribution control to form a non-illuminated region for preventing dazzling of persons in the vehicle ahead on the basis of the vehicle position of the detected vehicle ahead, to perform a light distribution control on the basis of the detected vehicle position for illumination regions outside the non-illuminated region in the vehicle width direction, and to perform a light distribution control on the basis of a vehicle position that is corrected for a parallax angle between the headlamp and the vehicle detector, for illumination regions inside the non-illuminated region in the vehicle width direction.

In other words, in the light distribution control device, the light distribution control for the outside illumination regions in the vehicle width direction of the headlamp is performed on the basis of a vehicle position obtained when the vehicle ahead is detected from the vehicle detector and the light distribution control for the inside illumination regions in the vehicle width direction is performed on the basis of a vehicle position that would be obtained if the vehicle ahead is assumed to be detected from a position of the headlamp.

In particular, in the light distribution control device in which headlamps are disposed at right and left positions of the vehicle, for the right headlamp, the light distribution controller performs a light distribution control on the basis of the detected vehicle position for illumination regions on the right of the non-illuminated region and performs a light distribution control on the basis of a vehicle position that is corrected for a parallax angle for illumination regions on the left of the non-illuminated region, and for the left headlamp, the light distribution controller performs a light distribution control on the basis of the detected vehicle position for illumination regions on the left of the non-illuminated region and performs a light distribution control on the basis of a vehicle position that is corrected for a parallax angle for illumination regions on the right of the non-illuminated region. For example, for the right headlamp, the left-side illumination regions are subjected to a light distribution control with a non-illuminated region that is expanded leftward from the non-illuminated region of the light distribution control formed on the basis of the detected vehicle position, and for the left headlamp, the right-side illumination regions are subjected to a light distribution control with a non-illuminated region that is expanded rightward from the non-illuminated region of the light distribution control formed on the basis of the detected vehicle position.

Advantages of the Invention

According to one mode of the invention, since margins are set for detected vehicle positions, various kinds of errors that accompany an ADB light distribution control are absorbed by the margins, whereby an appropriate ADB light distribution control can be realized. Furthermore, corrected vehicle positions are determined by setting margins for detected vehicle positions, illumination regions where a vehicle ahead exists are determined by comparing the corrected vehicle positions with plural illumination regions, and reduction of the light quantity of the determined illumination regions is controlled. Therefore, it is not necessary to set margins for plural respective illumination regions, and hence processing for reducing the light quantity in illumination regions can be simplified and an ADB light distribution control can be realized that is fast, that is, high in response speed. Still further, the illumination regions can be rendered in an illuminated state or a non-illuminated state in a preferable manner by controlling the values of the margins and their increase or decrease speed properly according to a manner of movement of a vehicle ahead in the left-right direction.

According to anode mode of the invention, since the boundary positions of each illumination region are changed depending to whether a vehicle ahead is a forward vehicle running in the same direction or an ongoing vehicle, a control can be made so that the non-illuminated region of a light distribution pattern is changed depending to whether the vehicle ahead is a forward vehicle running in the same direction or an ongoing vehicle, whereby the visibility of a region ahead of the self vehicle can be increased while dazzling of the driver etc. of the vehicle ahead can be prevented reliably. Furthermore, when illumination of part of the plural illumination regions is stopped, other illumination regions may be illuminated or flashed within the confines of a rated current, which makes it possible to realize an appropriate light distribution control that is suitable for a running situation.

In a further mode of the invention, for illumination regions outside a non-illuminated region in the vehicle width direction, a light distribution control is performed on the basis of a detected vehicle position. For illumination regions inside the non-illuminated region in the vehicle width direction, a light distribution control is performed on the basis of a vehicle position that is corrected for a parallax angle between the headlamp and the vehicle detector. Therefore, outside illumination regions in the vehicle width direction can be set in such a region as not to cause dazzling of the driver etc. of the vehicle ahead and inside illumination regions in the vehicle width direction can be set in a region that is shifted inward from a region that cause dazzling of the driver etc. of the vehicle ahead. Thus, dazzling of the driver etc. of the vehicle ahead can be prevented reliably.

In particular, in a vehicle having right and left headlamps, dazzling of the driver etc. of an approaching vehicle ahead due to light emitted from the right headlamp and dazzling of the driver etc. of a distant vehicle due to light emitted from the left headlamp can be prevented.

MODES FOR CARRYING OUT THE INVENTION

Embodiment 1

Figure 1:
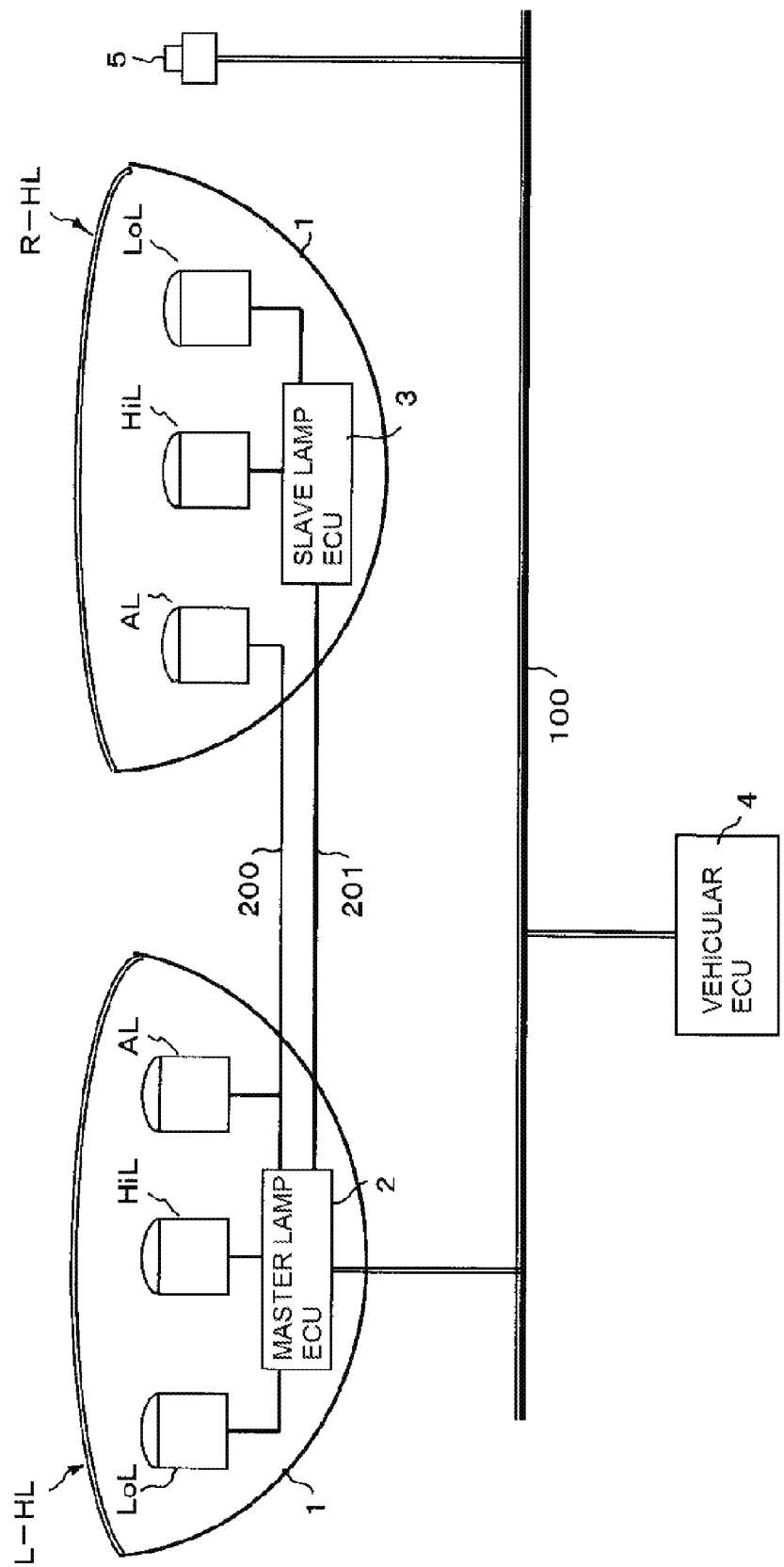
FIG. 1 is a schematic vertical sectional view of headlamps which are provided with a light distribution control device according to the present invention.
Figure 2A:
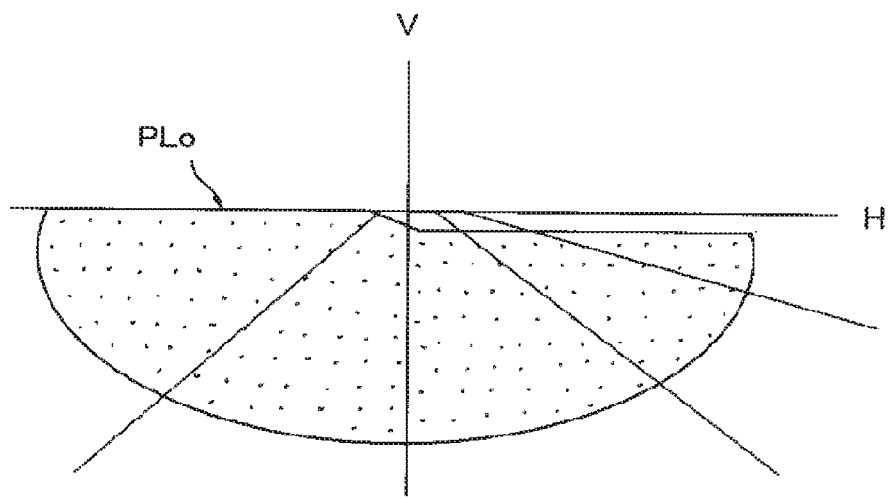
FIG. 2 shows low-beam, high-beam, and ADB light distribution patterns.
Figure 2B:
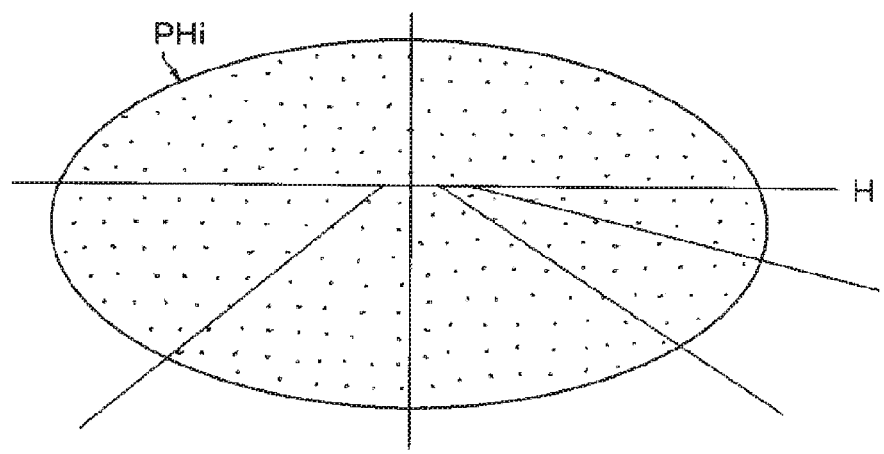

Next, an embodiment of the present invention will be described with reference to the drawings. FIG. 1 is a conceptual diagram showing the configuration of vehicular headlamps that employ an ADB light distribution control according to the invention. A left headlamp L-HL and a right headlamp R-HL which are disposed at front-left and front-right positions of a vehicle body of an automobile have approximately the same configurations. A low-beam lamp unit LoL, a high-beam lamp unit HiL, and an ADB lamp unit AL are disposed in each lamp housing 1. The low-beam lamp unit LoL and the high-beam lamp unit HiL will not be described in detail. Each lamp unit is a lamp unit in which LEDs (light-emitting diodes) are used as light sources, and emits light toward a region ahead of the self vehicle in a low-beam light distribution pattern PLo shown in FIG. 2(a) or a high-beam light distribution pattern PHi shown in FIG. 2(b) when lit.

Figure 3:
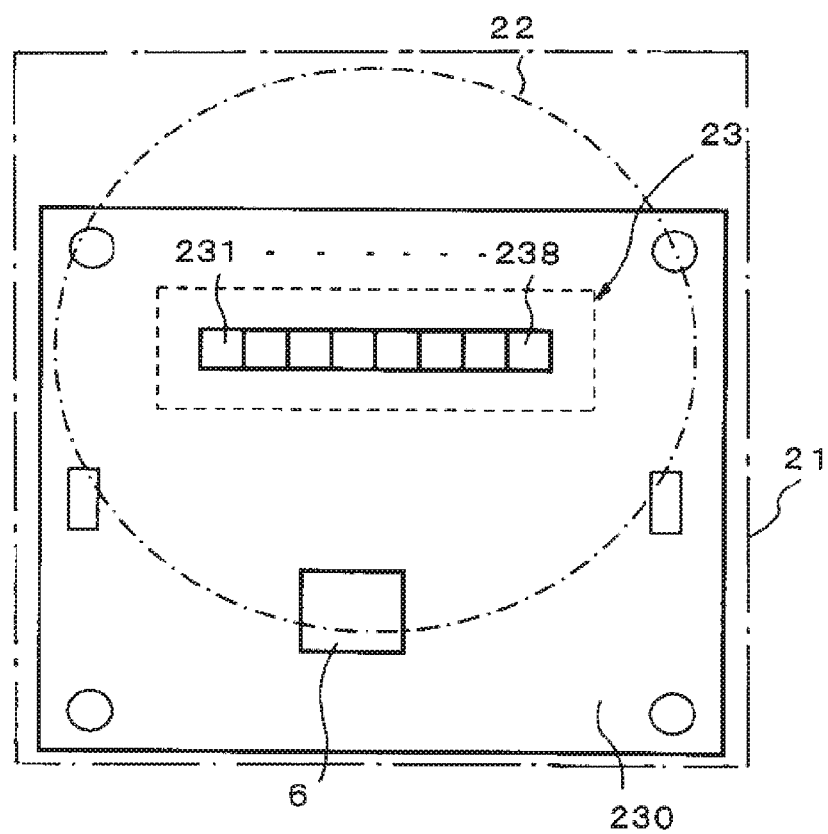
FIG. 3 is a schematic front view of an LED array package.

FIG. 3 is a schematic front view of an LED array package 23 which is a light source of each ADB lamp unit AL. An illumination lens 22 and an LED array package 23 are disposed inside a unit housing 21 of the ADB lamp unit AL. The LED array package 23 is installed in a state that plural (in this example, eight) one-chip LEDs (light-emitting diodes) 231-238 are arranged in line in the horizontal direction on a base board 230. Settings are made so that the LEDs 231-238 can be lit, turned off, and varied in luminous intensity individually by a lighting circuit (not shown in the figure).

Figure 2C:
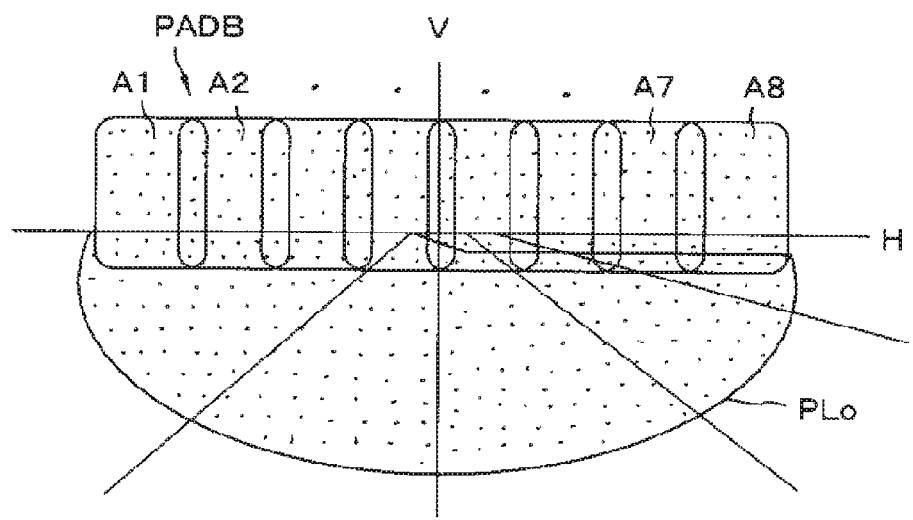
Figure 4:
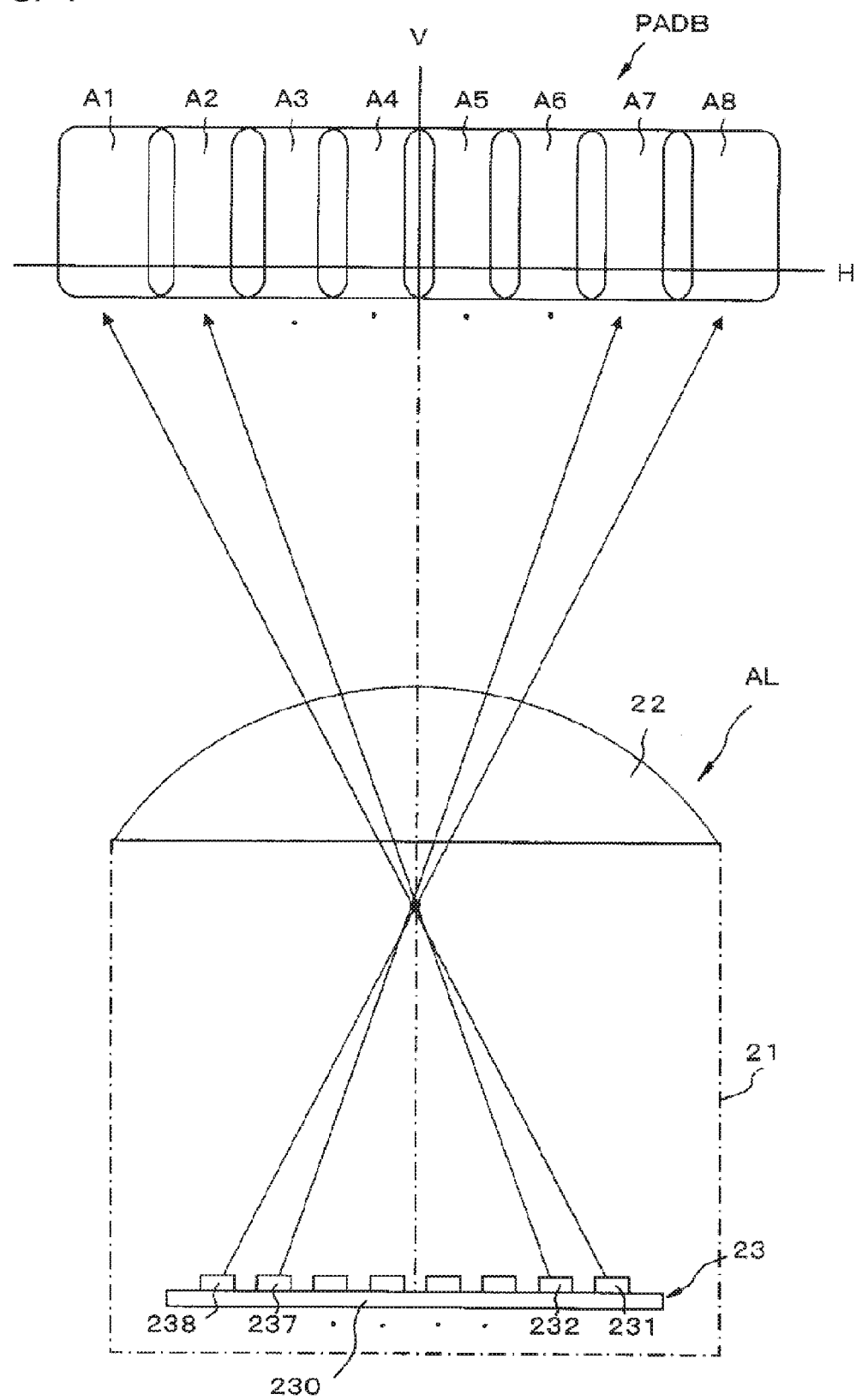
FIG. 4 shows a conceptual configuration of each ADB lamp unit and the ADB light distribution pattern.

FIG. 4 is a schematic plan view showing the configuration of each ADB lamp unit AL. As shown in FIG. 4, light beams emitted from the respective LEDs 231-238 shine on the illumination lens 22, through which a region ahead of the self vehicle is illuminated with light in an ADB light distribution pattern PADB. A top part of FIG. 4 is a light distribution pattern diagram showing the ADB light distribution pattern PADB. Prescribed illumination regions A1-A8 are illuminated with light beams coming from the LEDs 231-238, respectively, and a long and narrow ADB light distribution pattern PADB extending in the horizontal direction (left-right direction) is formed by overlapping the illumination regions A1-A8 with each other. As shown in FIG. 2(c), the ADB light distribution pattern PADB is a light distribution pattern in which the illumination regions A1-A8 which are illuminated by the eight respective LEDs 231-238 are arranged in the horizontal direction above the cutoff line of the low-beam light distribution pattern PLo shown in FIG. 2(a).

As shown in FIG. 1, a master lamp ECU 2 is disposed in the left headlamp L-HL and a slave lamp ECU 3 is disposed in the right headlamp R-HL. The master lamp ECU 2 generates a lighting control signal for controlling the lighting of the low-beam lamp unit LoL, the high-beam lamp unit HiL, and the ADB lamp unit AL of the left headlamp L-HL on the basis of various control signals that are received via a CAN (controller area network) line 100 of the automobile, and controls the lamp units LoL, HiL, and AL on the basis of the generated lighting control signal. The slave lamp ECU 3 controls the lighting of the low-beam lamp unit LoL and the high-beam lamp unit HiL of the right headlamp R-HL on the basis of a lighting control signal that is received from the master lamp ECU 2 via an LIN (local interconnect network) line 201. On the other hand, the ADB lamp unit AL of the right headlamp R-HL is connected to the master lamp ECU 3 of the left headlamp L-HL by an LIN line 200 and is lighting-controlled by the master lamp ECU 2 together with the ADB lamp unit AL of the left headlamp L-HL.

A vehicular ECU 4 is connected to the CAN line 100 to which the master lamp ECU 2 is connected. The vehicular ECU 4 outputs, to the CAN line 100, a lighting control signal for controlling the lighting of the lamp units of the headlamps L-HL and R-HL on the basis of a lighting signal that is sent from a lamp switch (not shown) that is disposed near the driver seat of the automobile. An imaging device 5 which is installed at a portion of the automobile (in this example, a portion above the front windshield of the automobile) and shoots a region ahead of the automobile is connected to the CAN line 100. When an image signal taken by the imaging device 5 is output to the CAN line 100, the vehicular ECU 4 detects a position and a manner of movement of a vehicle ahead that exists in a region ahead of the self vehicle on the basis of the image signal and outputs these pieces of detection information to the CAN line 100.

In the headlamps having the above configuration, if a high-beam light distribution control or a low-beam light distribution control is set by, for example, switching of a switch by the driver, the master lamp ECU 2 lighting-controls the high-beam lamp unit HiL or the low-beam lamp unit LoL of the left headlamp L-HL. At the same time, in the right headlamp R-HL, the slave lamp ECU 3 receives a signal from the master lamp ECU 2 and lighting-controls the high-beam lamp unit HiL or the low-beam lamp unit LoL. As a result, illumination is performed in the low-beam light distribution pattern PLo (see FIG. 2(a)) or the high-beam light distribution pattern PHi (see FIG. 2(b)).

On the other hand, if an ADB light distribution control is set by the driver, the vehicular ECU 4 detects a vehicle ahead that exists in a region ahead of the self vehicle on the basis of an image signal taken by the imaging device 5 and outputs resulting vehicle position information to the CAN line 100. The master lamp ECU 2 which is provided in the left headlamp L-HL acquires the vehicle position information of the vehicle ahead via the CAN line 100 and generates an ADB lighting control signal by performing necessary calculations on the basis of the vehicle position information. The master lamp ECU 2 controls the lighting of the respective ADB lamp units AL of the left headlamp L-HL and the right headlamp R-HL on the basis of the generated ADB lighting control signal. If no vehicle is detected ahead at this time, all of the eight LEDs 231-238 of each ADB lamp unit AL are lit. As a result, as shown in FIG. 2(c), an ADB light distribution pattern PADB is formed in which eight illumination regions A1-A8 are arranged so as to occupy the whole of a region that extends in the left-right direction and is located above the cutoff line of the low-beam light distribution pattern PLo. Since in this ADB light distribution control the ADB lamp units AL of the left and right headlamps are lighting-controlled simultaneously by the master lamp ECU 2, in the following description the ADB lamp units AL of the left and right headlamps will be described together without being discriminated from each other.

Figure 5A:
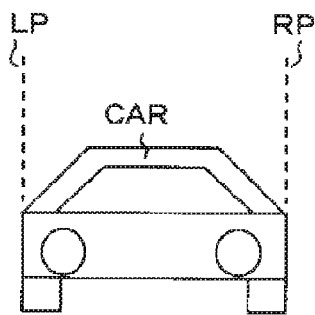
FIG. 5 is schematic diagrams illustrating an ADB light distribution control without margins.
Figure 5B:
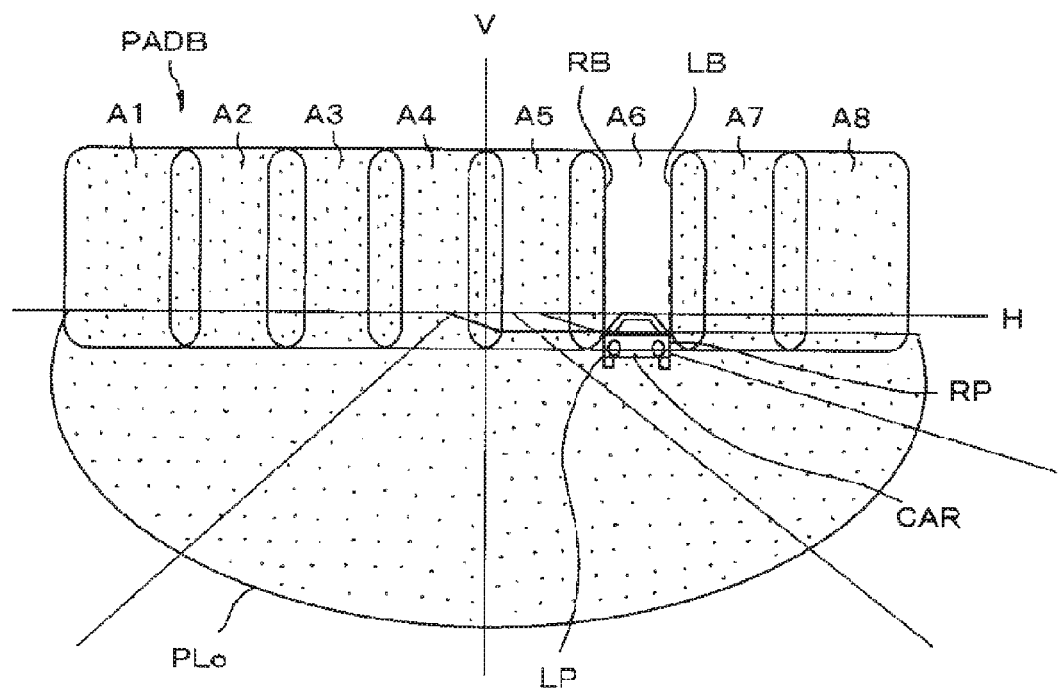

On the other hand, if a vehicle is detected ahead, as shown in FIG. 5(a), the master lamp ECU 2 detects a right end position RP and a left end position LP of the detected vehicle CAR ahead on the basis of the vehicle position information that is received via the CAN line 100. Although actually the right end position and the left end position are detected in the form of angles with respect to the straight movement direction of the self vehicle, in the following description they will be dealt with as coordinate positions in the left-right direction. Then, as shown in FIG. 5(b), the master lamp ECU 2 compares the detected right end position RP and left end position LP of the vehicle CAR ahead with left boundary positions LB and right boundary positions RB of the eight respective illumination regions A1-A8 which constitute the ADB light distribution pattern PADB. That is, the master lamp ECU 2 compares the left end position LP and the right end position RP with the left boundary positions LB and the right boundary positions RB of the eight respective illumination regions A1-A8, detects an illumination region where the vehicle CR ahead exists, and turns off the LED corresponding to the detected illumination region. In the example of FIG. 5(b), the left end position LP and the right end position RP of the vehicle CAR ahead are located between the right boundary position RB of the illumination region A5 and the left boundary position LB of the illumination region A7. Therefore, the LED 236 corresponding to the illumination region A6 is turned off and the other LEDs are lit. As a result, whereas the illumination region A6 where the vehicle CAR ahead exists is not illuminated to prevent dazzling of the driver etc. of the vehicle CAR ahead, the other regions A1-A5 and A7-A8 where no dazzling will occur are illuminated to increase the forward visibility from the self vehicle.

In this ADB light distribution control, the left end position LP and the right end position RP of a vehicle CAR ahead are compared with the left boundary positions LB and the right boundary positions RB of the respective illumination regions A1-A8. Therefore, it is possible to abstain from illuminating only a region to be used for preventing dazzling of the driver etc. of a vehicle ahead, which is effective in increasing the visibility. However, if the position of the lamp optical axis of the ADB lamp unit AL and the position, in the horizontal direction, of the imaging optical axis of the imaging device 5 do not coincide with each other completely, errors in the horizontal direction occur between the detected left end position LP and right end position RP of the vehicle CAR ahead and the left boundary positions LB and the right boundary positions RB of the respective illumination regions A1-A8. As described in the BACKGROUND ART section, these errors are a factor in causing dazzling of the driver etc. of the vehicle ahead or lowering the visibility due to an unnecessarily large degree of expansion of a non-illuminated region. In view of this, in Patent document 1, left and right margins are set for the left and right boundary positions, respectively, of each of plural illumination regions. However, in the technique of Patent document 1, since margins are set for each of plural illumination regions, various kinds of calculation processing such as processing of setting margins for the left and right boundary positions of each illumination region and processing of comparing left and right end positions of a vehicle ahead with the set left and right boundary positions are complex. In particular, in processing of changing the margin widths, it is necessary to perform processing of changing the left and right boundary positions for each of plural illumination regions; these kinds of processing are complex.

In the embodiment, the master lamp ECU 2 sets margins for left and right end positions of a vehicle CAR ahead that are acquired via the CAN line 100. That is, as shown in FIG.

6(a), a left margin Lm having a prescribe width is set on the left of an acquired left end position LP of a vehicle CAR ahead and a position that is deviated leftward by the left margin Lm is employed as a corrected left end position aLP. Likewise, a right margin Rm having a prescribe width is set on the right of an acquired right end position RP of the vehicle CAR ahead and a position that is deviated rightward by the right margin Rm is employed as a corrected right end position aRP. In the embodiment, the left margin Lm and the right margin Rm are set at the same value. These margins are set on the basis of various kinds of errors such as an error of a position of attachment, to the vehicle, of the imaging device 5 for detecting a vehicle CAR ahead, a calculation error that occurs when the vehicular ECU 4 or the master lamp ECU 2 calculates a vehicle position, and an illumination region setting error due to a setting error of the lamp optical axis of the headlamp, in particular, the ADB lamp unit AL. The margins are set as ones that are necessary to prevent the driver etc. of a vehicle ahead from being dazzled due to these errors when the ADB light distribution control described above with reference to FIG. 5 is performed.

Figure 6A:
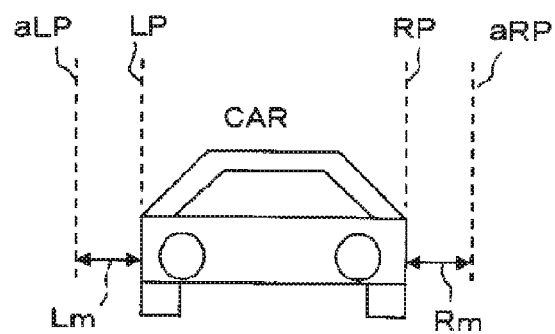
FIG. 6 is schematic diagrams illustrating an ADB light distribution control with margins.
Figure 6B:
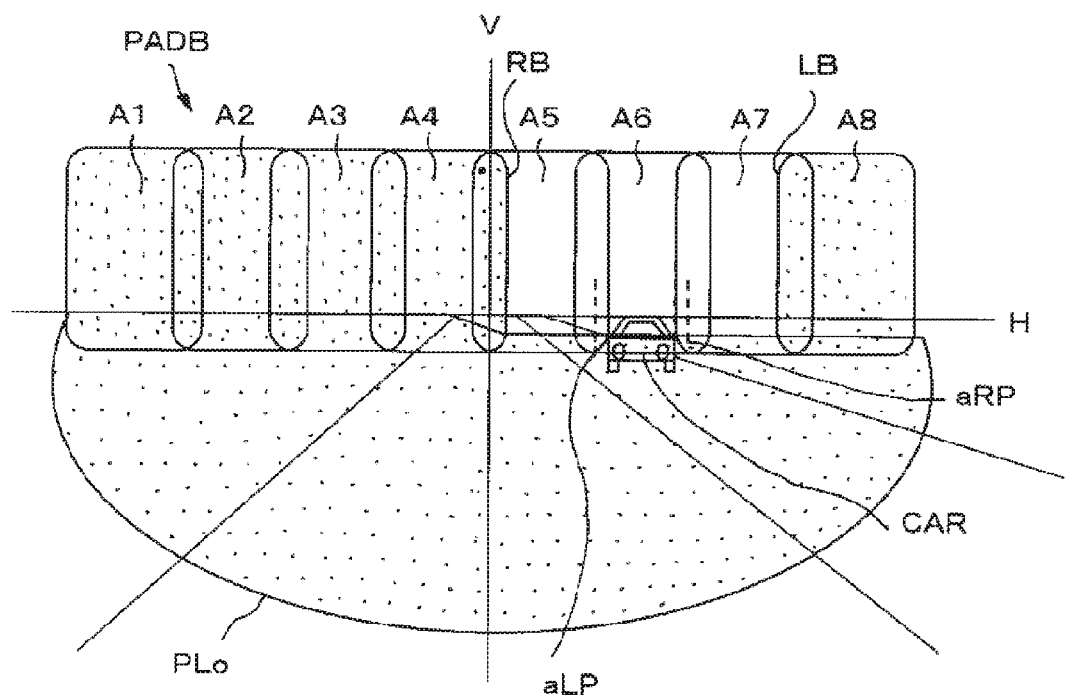

More specifically, in addition to setting the corrected left end position aLP and the corrected right end position aRP, as shown in FIG. 6(b), the master lamp ECU 2 compares the corrected left end position aLP and the corrected right end position aRP with left boundary positions LB and right boundary positions RB of eight respective illumination regions A1-A8 and detects illumination regions where the corrected left end position aLP and the corrected right end position aRP exist. And the master lamp ECU 2 turns off the LEDs corresponding to the illumination regions where the corrected left end position aLP and the corrected right end position aRP exist. In the example of FIG. 6(b), the illumination regions A5 and A6 where the corrected left end position aLP exists and the illumination regions A6 and A7 where the corrected right end position aRP exists are detected and the LEDs corresponding to the illumination regions A5-A7 are turned off and the other LEDs are lit. As a result, an ADB light distribution pattern PADB in which the illumination regions A5-A7 are not illuminated to become a non-illuminated region and the other illumination regions are illuminated is formed by the light distribution control.

As described above, an ADB light distribution control is performed in which a corrected left end position aLP and a corrected right end position aRP are determined by adding a margin to a left end position LP and a right end position RP of a vehicle CAR ahead and illumination regions where these corrected left and right end positions exist are detected and are not illuminated selectively to become a non-illuminated region. As a result, even if there exist errors as mentioned above such as an attachment position error of the imaging device 5, a calculation error of the ECU 2 or 4, and setting errors of illumination regions constituting an ADB light distribution pattern PADB, these errors can be absorbed and the driver etc. of the vehicle CAR ahead can be prevented from being dazzled by illumination light emitted from the ADB lamp unit AL. On the other hand, the illumination regions where the vehicle CAR ahead does not exist are rendered in an illuminated state, that is, illuminated by the ADB lamp unit AL, whereby the visibility of a region ahead of the self vehicle is increased. Incidentally, since the non-illuminated region of the case of FIG. 6(b) is larger than that of the case of FIG. 5(b), whereas the case of FIG. 6(b) is very effective in preventing dazzling of the driver etc. of a vehicle ahead, the effect of increasing the visibility is somewhat lowered. However, since a region where a vehicle ahead exists is usually illuminated by the illumination lamps of the vehicle ahead, this lowering of the visibility is negligible.

In the embodiment, the master lamp ECU 2 always monitors a variation of vehicle positions of a vehicle ahead that are received in time series via the CAN line 100, that is, a position variation of a vehicle CAR ahead in the left-right direction with respect to the self vehicle. Therefore, if the position of a vehicle CAR ahead varies in the left-right direction, the corrected left end position aLP and the corrected right end position aRP also vary accordingly. As a result, the non-illuminated region of an illumination region of an ADB light distribution pattern PADB is moved in the left-right direction and a proper ADB light distribution control can be realized that follows a left-right position variation of the vehicle ahead.

Figure 7A:
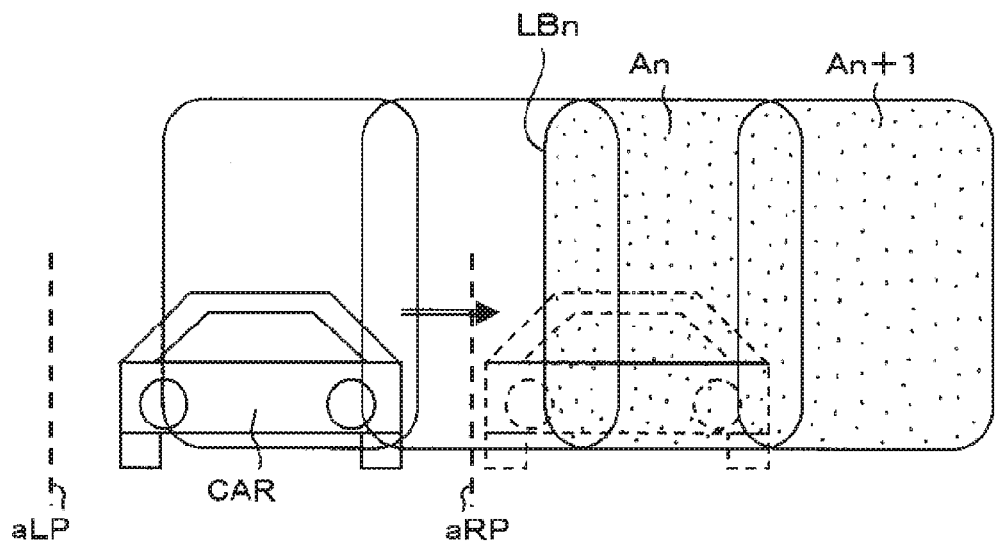
FIG. 7 is schematic diagrams illustrating a margin control.
Figure 7B:
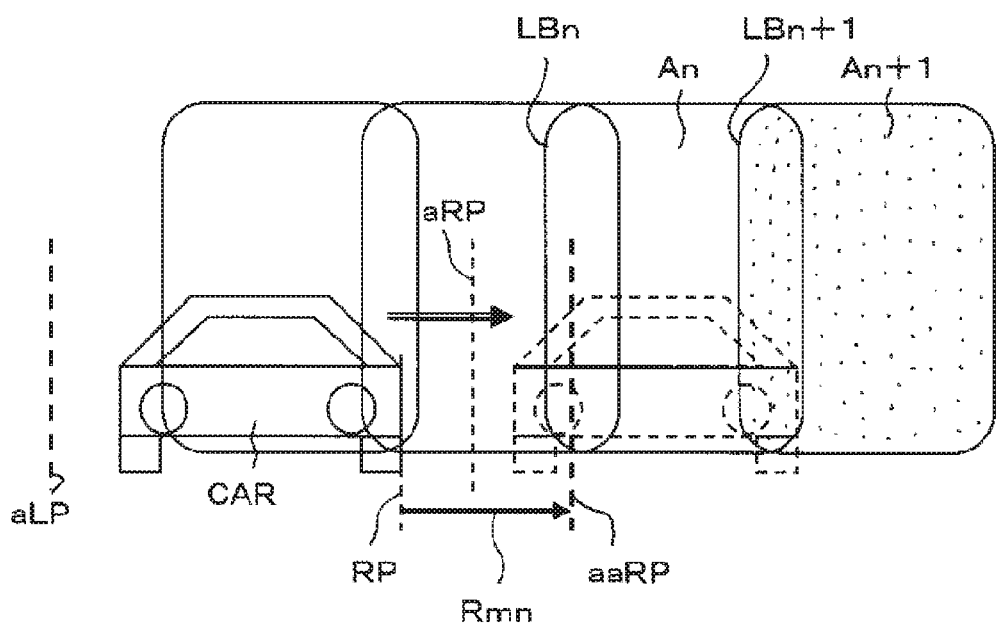

At the same time as monitors the vehicle position of a vehicle CAR ahead, the master lamp ECU 2 performs processing of varying the margin on the position variation destination side according to a temporal variation amount, that is, a position variation speed in the left-right direction, of the vehicle position. For example, when as indicated by broken lines in in FIG. 7(a) the position of a vehicle CAR ahead has varied rightward at high speed, the illumination of an illumination region An may not be turned off due to a processing delay even if the corrected right end position aRP passes the left end boundary LBn of an illumination region An, to cause an event that the driver etc. of the vehicle CAR ahead are dazzled by illumination light for the illumination region An. In view of this, as shown in FIG. 7(b), upon detection of a fact that a vehicle CAR ahead has moved rightward at high speed, the master lamp ECU 2 increases the right margin from Rm to Rmn immediately (Rm≤Rmn). As a result, a corrected right end position aaRP is placed even on the right of the ordinary corrected right end position aRP and hence comes be located on the right of the left end boundary LBn of the illumination region An quickly, whereby the illumination of the illumination region An is turned off quickly and dazzling of the driver etc. of the vehicle CAR ahead is prevented reliably. Similar processing is performed when a vehicle CAR ahead has moved leftward at high speed; in this case, the left margin is increased.

As described above, when a vehicle ahead has moved leftward or rightward at high speed, the margin on the position variation destination side is increased. At this time, the margin on the other side may be either left as it is or decreased. Leaving the margin on the other side as it is or decreasing it instead of increasing it is effective in increasing the visibility because the illumination regions on the other side which hardly cause dazzling can be rendered in an illuminated state with proper timing.

Furthermore, controls may be made so that the margin increase speed or rate is set higher than a prescribed value in increasing the left or right margin following a position variation of a vehicle ahead and that the margin decrease speed or rate is set lower than a prescribed value in decreasing the left or right margin following a position variation of a vehicle ahead. For example, in increasing the right margin when a vehicle ahead has moved rightward, the right margin is increased quickly at a high increase rate to set a corrected right end position. With this measure, the corrected right end position comes to be located in the right-hand illumination region with earlier timing, whereby the illumination of the right-hand illumination region is turned off quickly and dazzling of the driver etc. of the vehicle ahead is prevented reliably. On the other hand, in decreasing the margin on the side opposite to the destination side of the position variation of the vehicle ahead, the decrease speed and rate may be set low. As the position of the vehicle ahead varies rightward, a control is made so that the illumination of the illumination region on the left of the vehicle ahead is turned on. The illumination of this illumination region is turned on slowly by decreasing the left margin and setting its decrease rate low. This prevents an event that part of a region ahead of the self vehicle is switched suddenly from a non-illuminated state to an illuminated state, which in turn prevents the driver etc. of the self vehicle from being dazzled or feeling uncomfortable by the ADB light distribution control by the self vehicle The margin may be increased or decreased in proportion to a left or right position variation speed of a vehicle ahead. An alternative method may be employed in which a prescribed threshold value is set for a left or right position variation speed of a vehicle ahead and the margin is increased to a present value when a position variation speed exceeds the threshold value or decreased when a position variation speed becomes smaller than the threshold value. A smallest value of the margins is set on the basis of the above-described various kinds of errors and the margins are not made smaller than this value.

As described above, in the light distribution control according to the embodiment, it suffices to set a corrected left end position and a corrected right end position by adding respective margins to a detected left end position and right end position of a vehicle ahead and to compare the corrected left end position and a corrected right end position with left end positions and right end positions of plural respective illumination regions. Even when the margins are changed as a vehicle ahead moves in the left or right direction, it suffices to change only the left and right margins to change the corrected left end position and the corrected right end position. Therefore, unlike in Patent document 1, it is not necessary to perform processing for detecting an illumination region where a vehicle ahead exists taking into consideration margins that are set on the left and right of each of plural illumination regions or processing for changing the margins of each of the plural illumination regions when it needs to be performed. As a result, the processing of ADB light distribution control can be simplified and a quick ADB light distribution control capable of following a position variation of a vehicle ahead can be realized.

Although in the embodiment a non-illuminated region is formed by turning off the illumination of an illumination region where a vehicle ahead exists, a non-illuminated region may be formed by reducing the luminous intensity of that illumination region. It goes without saying that in this case the luminous intensity is reduced to such a value that illumination at that value does not dazzle the driver etc. of the vehicle ahead.

The embodiment is directed to the case of a single vehicle ahead. Where there exist plural vehicles ahead including a forward vehicle(s) running in the same direction and an oncoming vehicle(s), appropriate processing is that the plural vehicles ahead are recognized together as a vehicle group ahead, a left end position and a right end position of the vehicle group ahead, and respective margins are set for the left end position and the right end position. Appropriate processing for changing the margins is that the left margin and the right margins are controlled on the basis of movement directions in the left-right direction and manners of position variations of the left end position and the right end position. Therefore, it is appropriate to increase the left and right margins in the case where the left-right range of a vehicle group ahead expands and to decrease the left and right margins in the case where the left-right range of a vehicle group ahead narrows. However, also in this case, the margins are not made smaller than a prescribed value.

In the embodiment, the master lamp ECU 2 may detect an error of a straight running direction of the self vehicle from an imaging signal of a region ahead taken by the imaging device 5, in particular, a shot image of a road in a region ahead and fixed objects on the road. This will be explained below in a more specific manner. The directions of the imaging optical axis of the imaging device 5 and the lamp optical axis of the ADB lamp unit AL are set using an automobile straight running direction (vehicle axis) as a reference. Therefore, if the vehicle axis has an error with respect to an actual automobile straight running direction, the imaging optical axis and the lamp optical axis should also have errors. For example, let the error of the imaging optical axis with respect to the vehicle axis and the error of the lamp optical axis with respect to the vehicle axis be represented by $\pm\alpha$ and $\pm\beta$, respectively; then the maximum error of the lamp optical axis with respect to the imaging optical axis amounts to $\pm(\alpha+\beta)$. Where the setting error $\pm\gamma$ of the vehicle axis itself is taken into consideration, the maximum error of the lamp optical axis with respect to the vehicle axis amounts to $\pm(\alpha+\beta+\gamma)$. Therefore, it is necessary to set the above-mentioned left margin Lm and right margin Rm at values obtained by compensating for $(\alpha+\beta+\gamma)$, resulting in an unduly large non-illuminated region when an ADB light distribution control is performed. This is an obstruction to increase of the visibility.

The above-mentioned method makes it possible to detect an actual running direction, that is, a straight running direction, of the automobile by an image analysis on fixed object on a road and other things existing in an image taken by the imaging device 5 and hence to detect an error of the imaging optical axis of the imaging device 5 with respect to a correct straight running direction. That is, an error $\alpha+\gamma$ can be detected for the above-mentioned error $\alpha$. Therefore, by correcting for the error $\alpha+\gamma$ when the master lamp ECU 2 detects a left end position LP and a right end position RP of a vehicle ahead, as a result the error of the lamp optical axis with respect to the correct straight running direction can be suppressed to $\pm\beta$, whereby the above-described margins Lm and Rm can be decreased.

In connection with the above method, a straight running direction of the automobile may be detected by a two-axis or three-axis acceleration sensor. The margins relating to an error of the lamp optical axis with respect to the vehicle axis can be suppressed by making a correction as mentioned above on the basis of a detection output of the acceleration sensor installed in the automobile. Where an acceleration sensor is used for detecting a straight running direction, the acceleration sensor can be set in the same direction as the lamp optical axis if an acceleration sensor 6 is incorporated in the LED array package 23 of the ADB lamp unit AL so as to be integral with the latter in, for example, a manner shown in FIG. 3. By using an error $\pm\beta'$ of the lamp optical axis with respect to a correct straight running direction detected by the acceleration sensor, the attachment error $\pm\beta$ can be suppressed to $\pm\beta$, whereby the above-described margins Lm and Rm can be decreased further.

In the above-described embodiment, since an ADB light distribution pattern is formed by eight illumination regions A1-A8, a non-illuminated region for preventing dazzling of the driver etc. of a vehicle ahead is controlled in units of an illumination region. Therefore, for certain positional relationships between a vehicle ahead and the boundaries of illumination regions, there may occur a non-illuminated region that is larger than a region determined by the margins. In that event, it is preferable to perform such a control as to increase the luminous intensity of the illumination regions that are adjacent to the vehicle ahead and are to be illuminated. That is, by increasing the luminous intensity of these illumination regions, each of these illumination regions is substantially expanded in the left and right directions, whereby the portions, located between the vehicle ahead and the illuminated regions, of the non-illuminated region are narrowed to increase the visibility in this region. For example, in the case of FIG. 6(b), the current flowing through the LEDs 234 and 238 corresponding to the illumination regions A4 and A8 are increased to increase the luminous intensity of the illuminations regions A4 and A8. As a result, the illuminations regions A4 and A8 are expanded substantially and hence the non-illuminated region can be narrowed.

Although in the embodiment an ADB light distribution pattern is formed by forming eight illumination regions A1-A8 by the eight LEDs, the invention is not limited to the case of forming such an ADB light distribution pattern. The pattern shape of each illumination region, the number of LEDs, and the number of illumination regions may be set to a desired shape and numbers.

Embodiment 2

Figure 8:
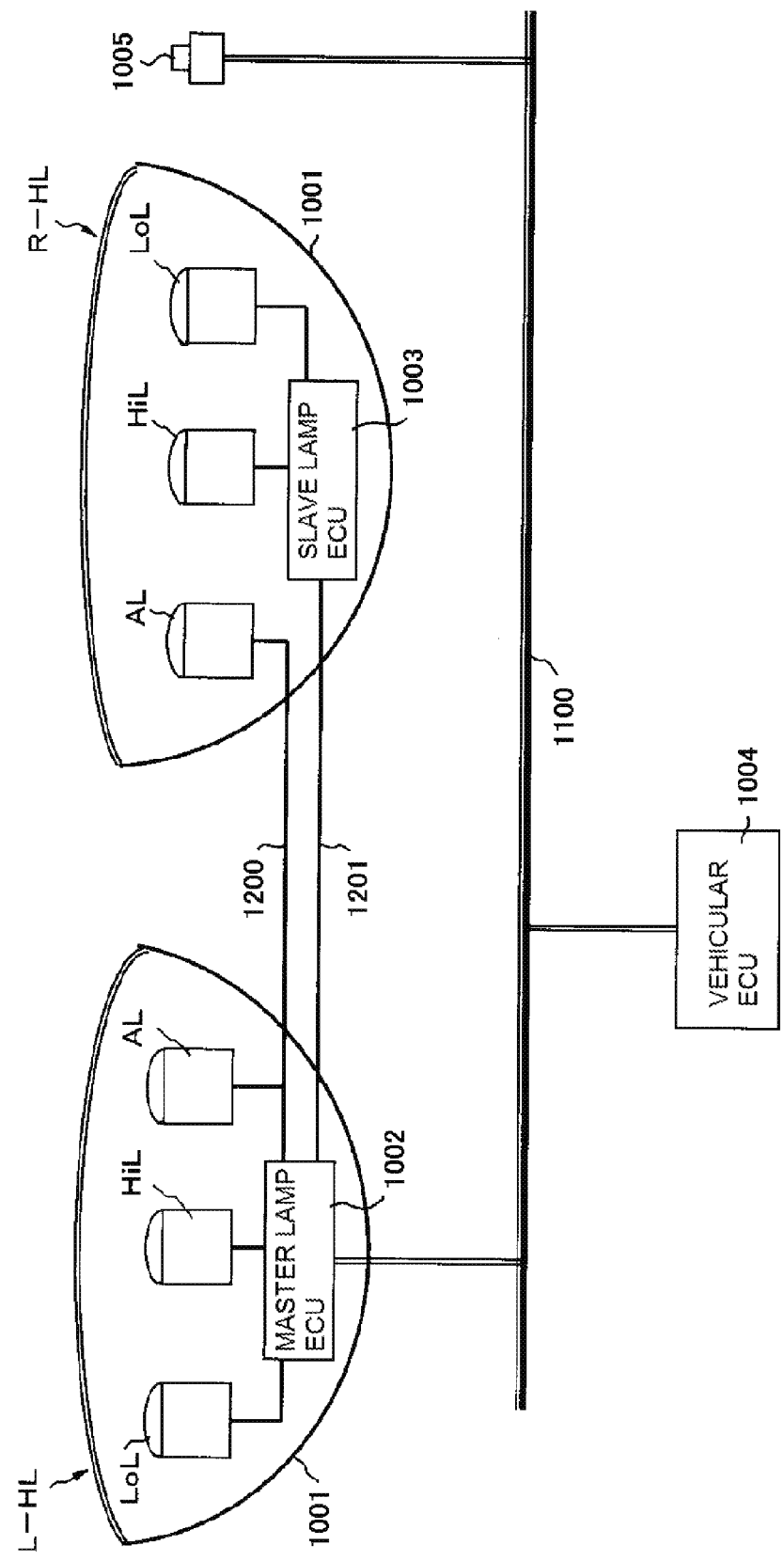
FIG. 8 is a schematic vertical sectional view of headlamps which are provided with another light distribution control device according to the invention.
Figure 9A:
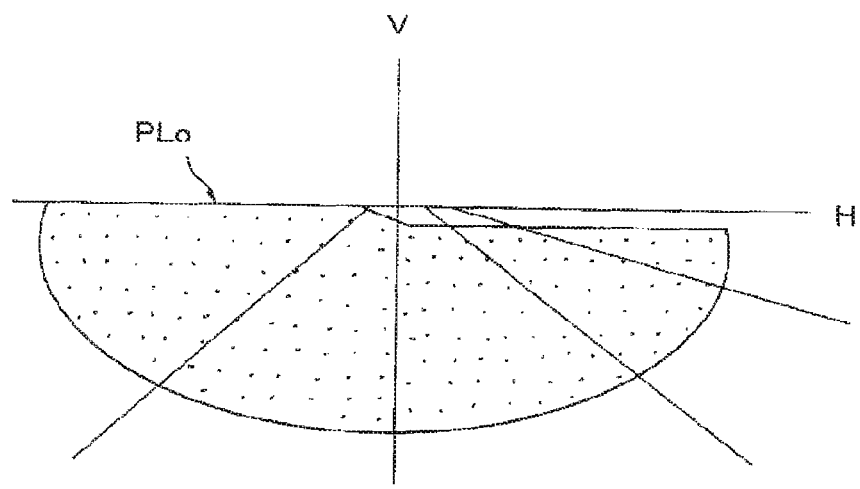
FIG. 9 shows low-beam, high-beam, and ADB light distribution patterns.
Figure 9B:
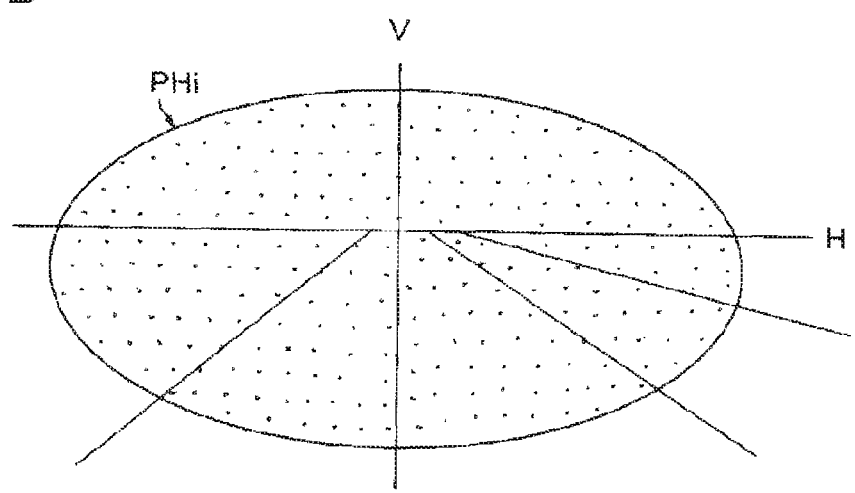

Next, another embodiment of the invention will be described with reference to the drawings. FIG. 8 is a conceptual diagram showing the configuration of vehicular headlamps according to the embodiment. A left headlamp L-HL and a right headlamp R-HL which are disposed at front-left and front-right positions of a vehicle body of an automobile have approximately the same configurations. A low-beam lamp unit LoL, a high-beam lamp unit HiL, and an ADB lamp unit AL are disposed in each lamp housing 1001. The low-beam lamp unit LoL and the high-beam lamp unit HiL will not be described in detail. Each lamp unit is a lamp unit in which LEDs (light-emitting diodes) are used as light sources, and emits light toward a region ahead of the self vehicle in a low-beam light distribution pattern PLo shown in FIG. 9(a) or a high-beam light distribution pattern PHi shown in FIG. 9(b) when lit.

Figure 10:
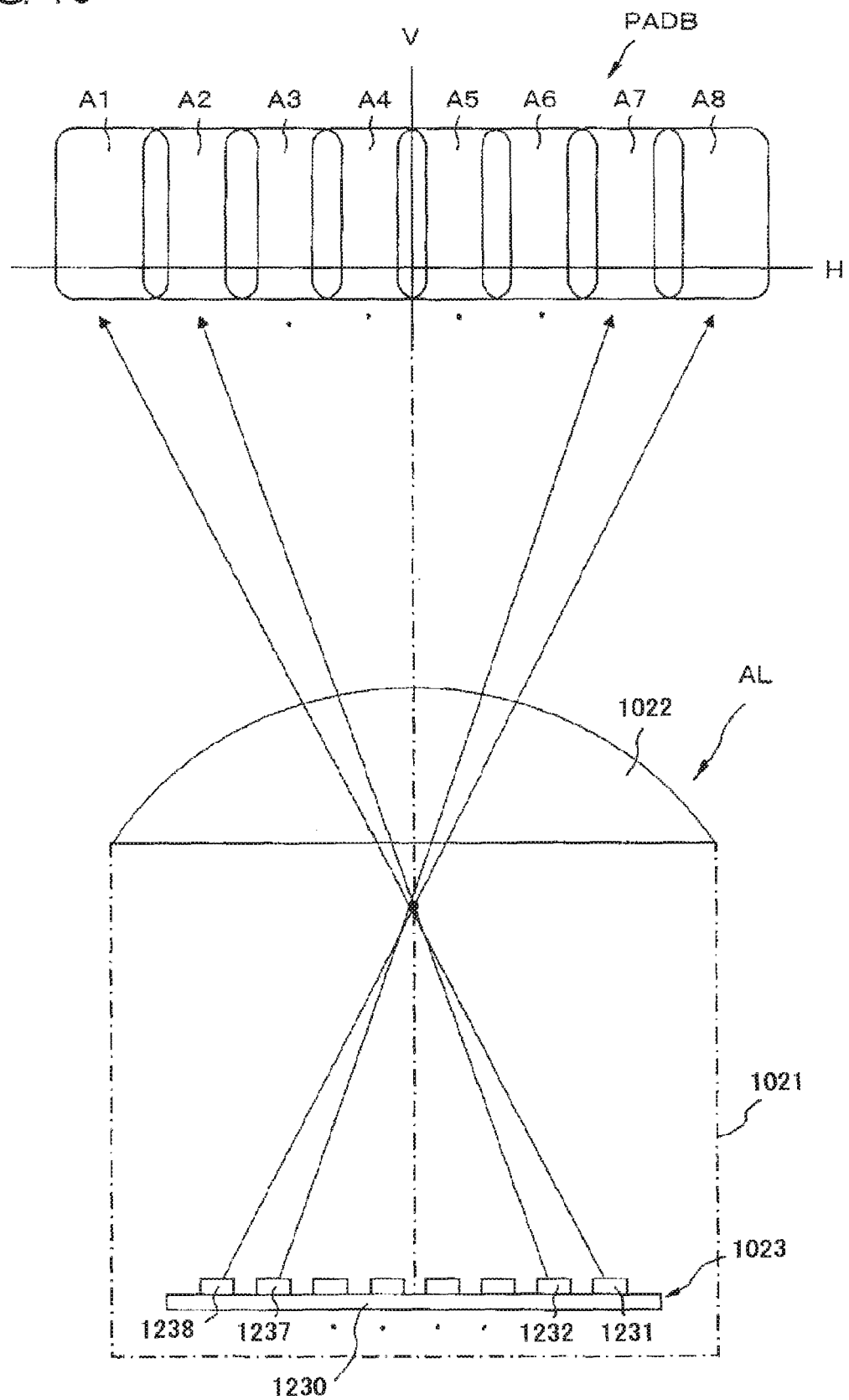
FIG. 10 shows a conceptual configuration of each ADB lamp unit and the ADB light distribution pattern.

As shown in FIG. 10 which is a schematic plan view showing the configuration of each ADB lamp unit AL, an illumination lens 1022 and an LED array package 1023 are disposed inside a unit housing 1021. The LED array package 1023 is installed in a state that plural (in this example, eight) one-chip LEDs (light-emitting diodes) 1231-1238 are arranged in line in the horizontal direction on a base board 1230. Settings are made so that the LEDs 1231-1238 can be lit, turned off, and varied in luminous intensity individually by a lighting circuit (not shown in the figure).

Figure 9C:
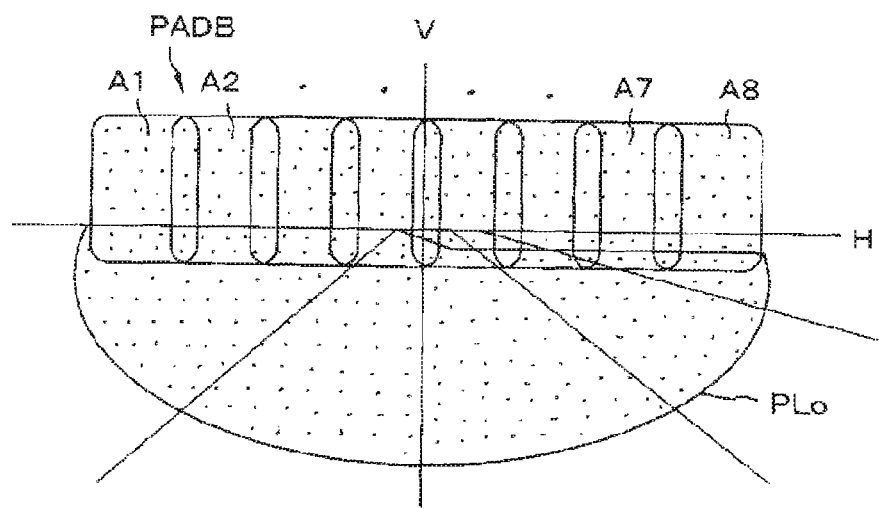

A region ahead of the self vehicle is illuminated with light beams emitted from the respective LEDs 1231-1238 through the illumination lens 1022 in an ADB light distribution pattern PADB. A top part of FIG. 10 is a light distribution pattern diagram showing the ADB light distribution pattern PADB. Prescribed illumination regions A1-A8 are illuminated with light beams coming from the LEDs 1231-1238, respectively, and a long and narrow ADB light distribution pattern PADB extending in the horizontal direction (left-right direction) is formed by overlapping the illumination regions A1-A8 with each other. As shown in FIG. 9(c), the ADB light distribution pattern PADB is a light distribution pattern in which the illumination regions A1-A8 which are illuminated by the eight respective LEDs 1231-1238 are arranged in the horizontal direction above the cutoff line of the low-beam light distribution pattern PLo shown in FIG. 2(a).

As shown in FIG. 8, a master lamp ECU 1002 is disposed in the left headlamp L-HL and a slave lamp ECU 1003 is disposed in the right headlamp R-HL. The master lamp ECU 1002 generates a lighting control signal for controlling the lighting of the low-beam lamp unit LoL, the high-beam lamp unit HiL, and the ADB lamp unit AL of the left headlamp L-HL on the basis of various control signals that are received via a CAN (controller area network) line 1100 of the automobile, and controls the lamp units LoL, HiL, and AL on the basis of the generated lighting control signal. The slave lamp ECU 1003 controls the lighting of the low-beam lamp unit LoL and the high-beam lamp unit HiL of the right headlamp R-HL on the basis of a lighting control signal that is received from the master lamp ECU 1002 via an LIN (local interconnect network) line 1201. On the other hand, the ADB lamp unit AL of the right headlamp R-HL is connected to the master lamp ECU 1002 of the left headlamp L-HL by an LIN line 1200 and is lighting-controlled by the master lamp ECU 1002 together with the ADB lamp unit AL of the left headlamp L-HL.

A vehicular ECU 1004 is connected to the CAN line 1100 to which the master lamp ECU 1002 is connected. The vehicular ECU 1004 outputs, to the CAN line 1100, a lighting control signal for controlling the lighting of the lamp units of the headlamps L-HL and R-HL on the basis of a lighting signal that is sent from a lamp switch (not shown) that is disposed near the driver seat of the automobile. An imaging device 1005 which is installed at a portion of the automobile (in this example, a portion above the front windshield of the automobile) and shoots a region ahead of the automobile is connected to the CAN line 1100. When an image signal taken by the imaging device 1005 is output to the CAN line 1100, the vehicular ECU 1004 detects a vehicle ahead that exists in a region ahead of the self vehicle on the basis of the image signal and outputs resulting detection information to the CAN line 1100.

In the headlamps having the above configuration, if a high-beam light distribution control or a low-beam light distribution control is set by, for example, switching of a switch by the driver, the master lamp ECU 1002 lighting-controls the high-beam lamp unit HiL or the low-beam lamp unit LoL of the left headlamp L-HL. At the same time, in the right headlamp R-HL, the slave lamp ECU 1003 receives a signal from the master lamp ECU 1002 and lighting-controls the high-beam lamp unit HiL or the low-beam lamp unit LoL. As a result, illumination is performed in the low-beam light distribution pattern PLo (see FIG. 9(a)) or the high-beam light distribution pattern PHi (see FIG. 9(b)).

On the other hand, if an ADB light distribution control is set by the driver, the vehicular ECU 1004 detects a vehicle ahead that exists in a region ahead of the self vehicle on the basis of an image signal taken by the imaging device 1005 and outputs resulting vehicle information to the CAN line 1100. The master lamp ECU 1002 which is provided in the left headlamp L-HL acquires the vehicle information of the vehicle ahead via the CAN line 1100, performs necessary calculations on the basis of the vehicle information, detects a vehicle position of the vehicle ahead and whether the vehicle ahead is an oncoming vehicle or a forward vehicle running in the same direction, and generates an ADB lighting control signal on the basis of detection results. The master lamp ECU 1002 controls the lighting of the respective ADB lamp units AL of the left headlamp L-HL and the right headlamp R-HL on the basis of the generated ADB lighting control signal.

If no vehicle is detected ahead at this time, all of the eight LEDs 1231-1238 of each ADB lamp unit AL are lit. As a result, as shown in FIG. 9(c), an ADB light distribution pattern PADB is formed in which eight illumination regions A1-A8 are arranged so as to occupy the whole of a region that extends in the left-right direction and is located above the cutoff line of the low-beam light distribution pattern PLo. Since in this ADB light distribution control the ADB lamp units AL of the left and right headlamps are lighting-controlled simultaneously by the master lamp ECU 1002, in the following description the ADB lamp units AL of the left and right headlamps will be described together without being discriminated from each other.

Figure 11A:
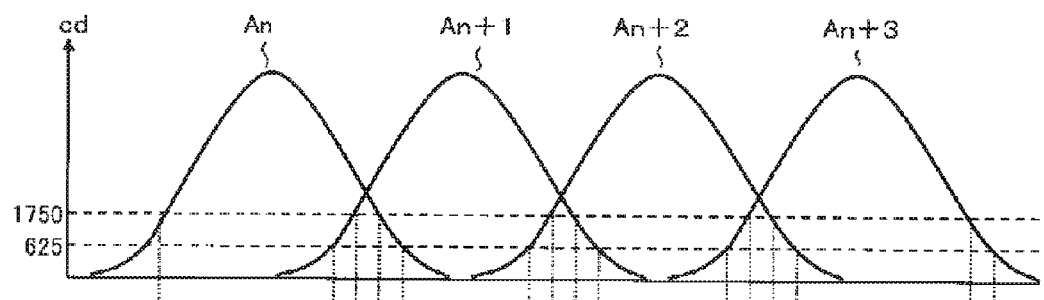
FIG. 11 shows a relationship between an LED luminous intensity distribution in each illumination region and boundary positions of each illumination region.

On the other hand, if a vehicle is detected ahead, the master lamp ECU 1002 detects whether the vehicle ahead is an oncoming vehicle or a forward vehicle running in the same direction on the basis of the vehicle information of the vehicle ahead received from the CAN line 1100. Since various techniques for detecting an oncoming vehicle and a forward vehicle running in the same direction in a discriminated manner have already been proposed, no specific technique for this purpose will be described below. After detecting an oncoming vehicle or a forward vehicle running in the same direction, the master lamp ECU 1002 determines boundary positions of the illumination regions. This will be explained below in a more specific manner. A left end boundary position and a right end boundary position are set for each of the above-described eight illumination regions. FIG. 11 illustrates the boundary positions of the illumination regions. In FIG. 11(a), the horizontal axis represents the position in the left-right direction and the vertical axis represents luminous intensities (illuminance (cd)) when the respective illumination regions are illuminated. Each of illumination regions An to An+3 (in the embodiment, n is an integer varying from 1 to 5) is illuminate by an LED. Each of the illumination regions An to An+3 is given a mountain-shaped luminous intensity distribution characteristic that depends on a light emission characteristic of each LED and an illumination optical system including the illumination lens 1022. By applying a dazzling allowable luminous intensity that is prescribed by a law or regulations to this luminous intensity distribution characteristic, a position where the characteristic has a dazzling allowable luminous intensity level 1,750 cd for a forward vehicle running in the same direction is obtained as a forward vehicle boundary position Bf and a position where the characteristic has a dazzling allowable luminous intensity level 625 cd for an oncoming vehicle running is obtained as an oncoming vehicle boundary position Bo.

Figure 11B:
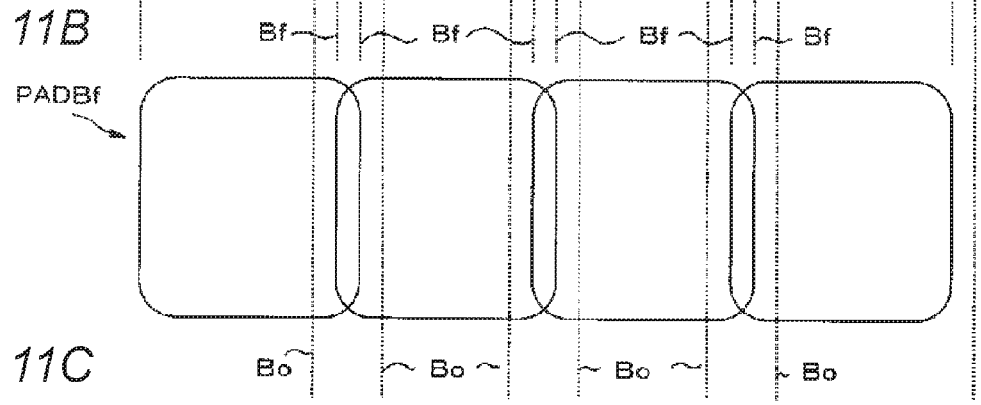
Figure 11C:
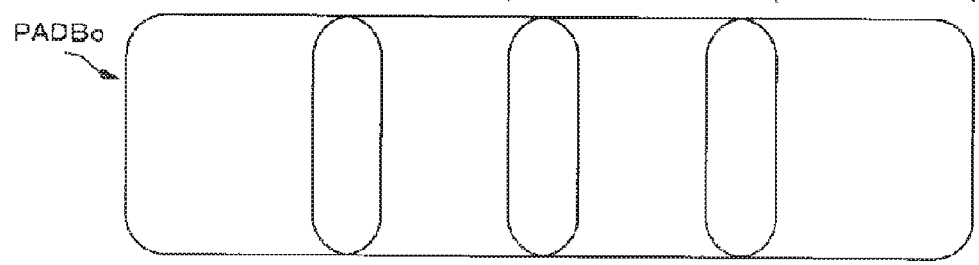

Therefore, an ADB light distribution pattern PADBf that is defined using the forward vehicle boundary positions Bf becomes as shown in FIG. 11(b). For a single illumination region, dazzling does not occur even if an forward vehicle is illuminated that is located in a low-luminous-intensity region outside either forward vehicle boundary position Bf of the illumination region. Likewise, an ADB light distribution pattern PADBo that is defined using the oncoming vehicle boundary positions Bo becomes as shown in FIG. 11(c). For a single illumination region, dazzling does not occur even if an oncoming vehicle is illuminated that is located in a low-luminous-intensity region outside either oncoming vehicle boundary position Bo of the illumination region. In this manner, with the oncoming vehicle boundary positions Bo, the ADB light distribution pattern PADBo is obtained in which adjoining illumination regions have a wide overlap. With the forward vehicle boundary positions Bf, the ADB light distribution pattern PADBf is obtained in which adjoining illumination regions have a narrow overlap or almost no overlap. That is, since the dazzling allowable luminous intensity for a forward vehicle running in the same direction is higher than for an oncoming vehicle, a dazzling-free region for a forward vehicle running in the same direction is wider than for an oncoming vehicle.

Figure 12A:
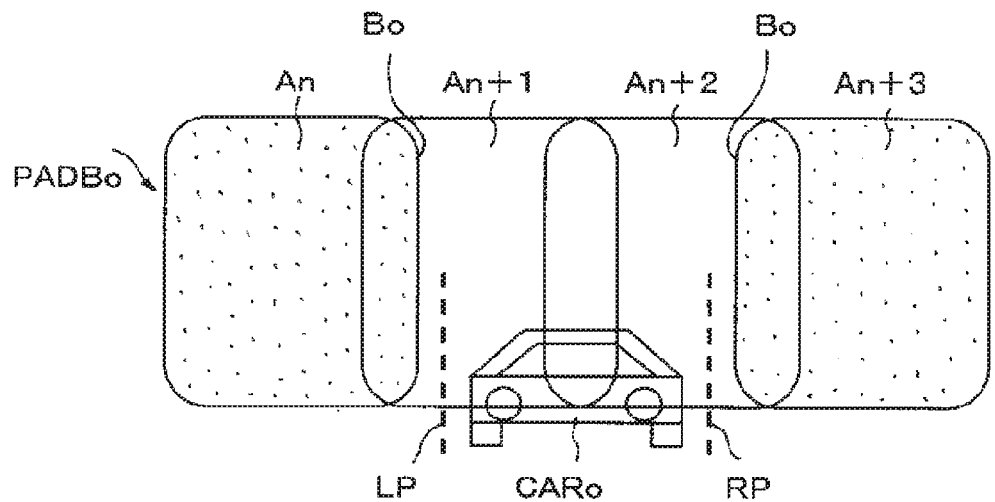
FIG. 12 shows example ADB light distribution patterns for an oncoming vehicle and a forward vehicle running in the same direction.
Figure 12B:
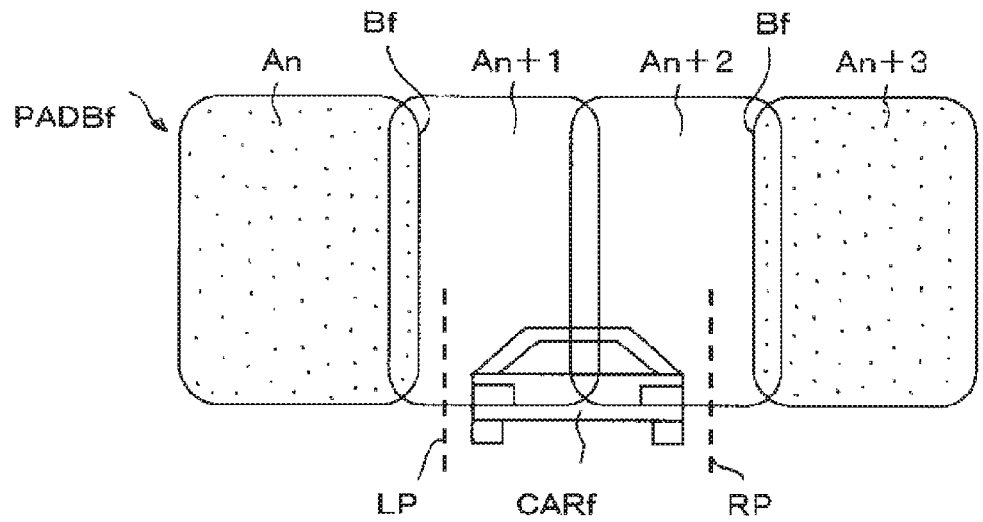

Oncoming vehicle boundary positions Bo and forward vehicle boundary positions Bf are set for each of the illumination regions An to An+3 (in the embodiment, A1-A8) in advance and stored in the master lamp ECU 1002. And, as shown in FIG. 12A and FIG. 12B, the master lamp ECU 1002 sets a right end position RP and a left end position LP by adding a prescribed margin to the right end position and the left end position of a detected vehicle CAR ahead. The margin is set on the basis of various kinds of errors such as an error of a position of attachment, to the vehicle, of the imaging device 1005 for detecting a vehicle CAR ahead, a calculation error that occurs when the vehicular ECU 1004 or the master lamp ECU 1002 calculates a vehicle position, and an illumination region setting error due to a setting error of the lamp optical axis of the headlamp, in particular, the ADB lamp unit AL. The margin is set as a margin that is necessary to prevent the driver etc. of a vehicle ahead from being dazzled due to these errors when an ADB light distribution control is performed.

The master lamp ECU 1002 determines which of the oncoming vehicle boundary position Bo and the forward vehicle boundary position Bf to employ on the basis of whether the detected vehicle ahead is an oncoming vehicle or a forward vehicle running in the same direction, compares the left end position LP and the right end position RP of the vehicle ahead with the boundary positions Bo or Bf of each of the eight illumination regions A1-A8, and detects illumination regions where the left end position LP and the right end position RP exist, in other words, illumination regions where the vehicle ahead exists. And the master lamp ECU 1002 turns off the LEDs corresponding to the illumination regions where the vehicle ahead exists. In the case of FIG. 12(a), since the vehicle ahead is an oncoming vehicle CARo, the master lamp ECU 1002 compares the left end position LP and the right end position RP of the oncoming vehicle CARo with the oncoming vehicle boundary positions Bo of each of the illumination regions An to An+3, detects illumination regions An+1 and An+2 where the oncoming vehicle CARo exists, and turns off the LEDs corresponding to the detected illumination regions An+1 and An+2. As a result, the ADB light distribution pattern PADBo is made such that the illumination regions An+1 and An+2 are made a non-illuminated region and the other illumination regions are illuminated.

In the case of FIG. 12(b), since the vehicle ahead is a forward vehicle CARf running in the same direction, the master lamp ECU 1002 compares the left end position LP and the right end position RP of the forward vehicle CARf with the forward vehicle boundary positions Bf of each of the illumination regions An to An+3, detects illumination regions An+1 and An+2 where the forward vehicle CARf exists, and turns off the LEDs corresponding to the detected illumination regions An+1 and An+2. As a result, the ADB light distribution pattern PADBf is made such that the illumination regions An+1 and An+2 are made a non-illuminated region and the other illumination regions are illuminated.

As is understood by comparing FIGS. 12(a) and 12(b), the non-illuminated region for the oncoming vehicle CARo is narrower than that for the forward vehicle CARf. As a result, even if as shown in FIG. 12(a) the boundary positions Bo of the illumination regions An and An+3 on the two respective sides come close to the two respective ends of the oncoming vehicle CARo, there is no risk of dazzling the driver etc. of the oncoming vehicle CARo because the luminous intensity at the boundary positions Bo is as low as 625 cd. On the other hand, the illumination regions An and An+3 on the two respective sides allow illumination to positions close to the two respective ends of the oncoming vehicle CARo, whereby the visibility of a region ahead of the self vehicle is kept high. On the other hand, since as shown in FIG. 12(b) the non-illuminated region for the forward vehicle CARf is wide, driver etc. of the forward vehicle CARf are hardly dazzled though the luminous intensity at the boundary positions Bf of the illumination regions An and An+3 on the two respective sides is as high as 1,750 cd. Furthermore, since the luminous intensity at the boundary positions Bf of the illumination regions An and An+3 on the two respective sides is as high, the visibility of a region ahead of the self vehicle can be kept high though the non-illuminated region is wide.

In the embodiment, two different boundary positions Bo and Bf are set as each boundary of each illumination region so as to correspond to an oncoming vehicle and a forward vehicle running in the same direction and the boundary positions Bo or Bf are set depending on whether a detected vehicle ahead is an oncoming vehicle or a forward vehicle running in the same direction. Alternatively, another number of boundary positions may be set. For example, it is possible to set two or more boundary positions for an oncoming vehicle and select one of the two or more boundary positions according to a distance from the self vehicle to an oncoming vehicle or a vehicle speed of the self vehicle. This makes it possible to realize a more accurate light distribution control. This also applies to the case of a forward vehicle running in the same direction. As a further alternative, selection may be made from different boundary positions of each boundary of each illumination region also taking into consideration a vehicle type of a vehicle ahead such as a large-size vehicle, a motorcycle, or the like.

When LEDs corresponding to part of the illumination regions are turned off to render them in a non-illuminated state, the electric energy that has been supplied to the turned-off LEDs may be supplied to other LEDs. This will be explained below in a more specific manner. In the LED array package 1023 shown in FIG. 10, the rated electric energy supplied to the entire LED array package 1023 is restricted to restrict the amount of heat generated by the LEDs 1231-1238 and, at the same time, their power consumption. Therefore, while all of the LEDs 1231-1238 are emitting light, the current flowing through each LED cannot be increased. However, when part of the LEDs are de-energized, it possible to divert the current that has been supplied to those LEDs to other LEDs within the confines of the rated electric energy. This measure makes it possible to prevent dazzling of the driver etc. of a vehicle ahead reliably or increase the visibility from the self vehicle when part of the illumination regions are rendered in a non-illuminated state.

Figure 13A:
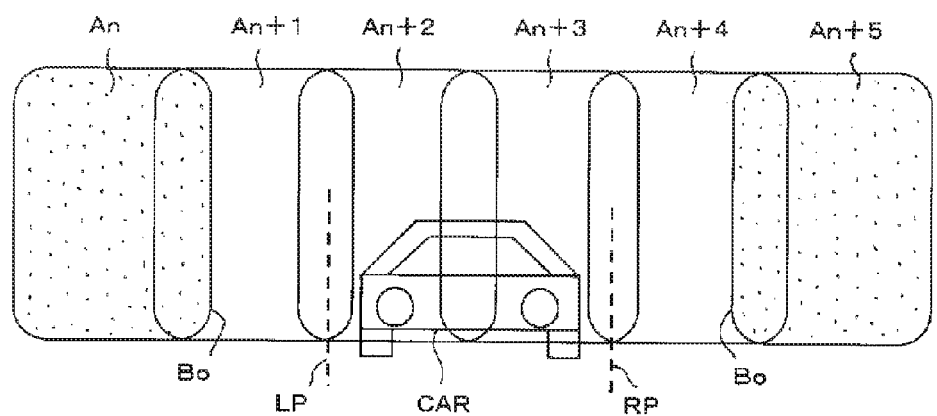
FIG. 13 shows light distribution patterns and an LED array and illustrates an example luminous intensity control for illumination regions in a case of a wide non-illuminated region.
Figure 13B:
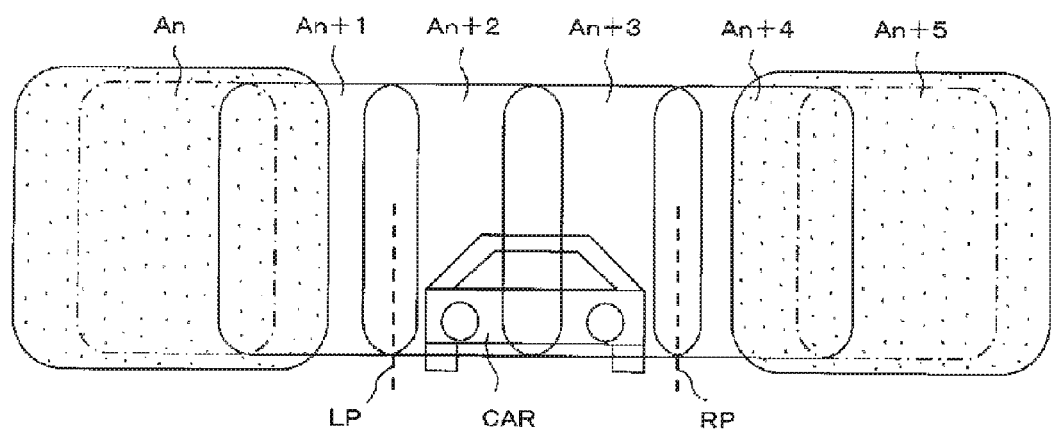

For example, in the embodiment, for certain relationships between a vehicle ahead and the illumination regions, a non-illuminated region that covers both side regions of a vehicle ahead becomes unnecessarily wide. In the example of FIG. 13(a), four illumination regions An+1 to An+4 are not illuminated to form, for a vehicle CAR ahead, a non-illuminated region that is wide in the left-right direction. In this case, the master lamp ECU 1002 compares the vehicle ahead and the illumination regions and, if the differences between the left end position LP and the right end position RP of the vehicle CAR ahead and the adjacent boundary positions Bo of illumination regions are larger than a prescribed value (e.g., about ⅓ of the left-right width of each illumination region), performs a control so as to increase the luminous intensity of the LEDs corresponding to the illumination regions An and An+5 which are adjacent to the non-illuminated illumination regions An+1 to An+4. As a result, as shown in FIG. 13(b), the luminous intensity distributions of the illumination regions An and An+5 which are located on the two respective sides of the non-illuminated illumination regions An+1 to An+4 enlarge and hence these illumination regions substantially expand in the left-right direction. Thus, the non-illuminated region is narrowed substantially in such a manner as not to dazzle the driver etc. of the vehicle CAR ahead and the visibility of a region ahead of the self vehicle can be increased.

Figure 14A:
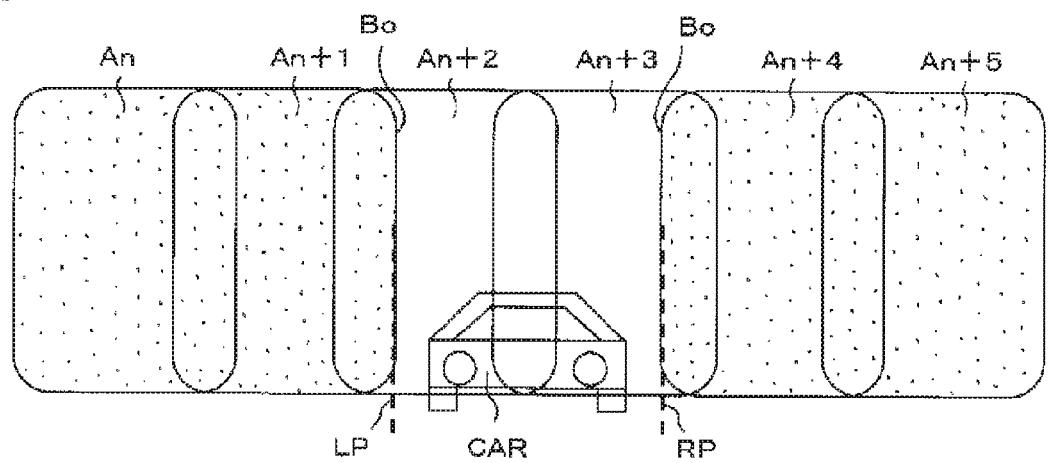
FIG. 14 shows light distribution patterns and the LED array and illustrates an example luminous intensity control for illumination regions in a case of a narrow non-illuminated region.
Figure 14B:
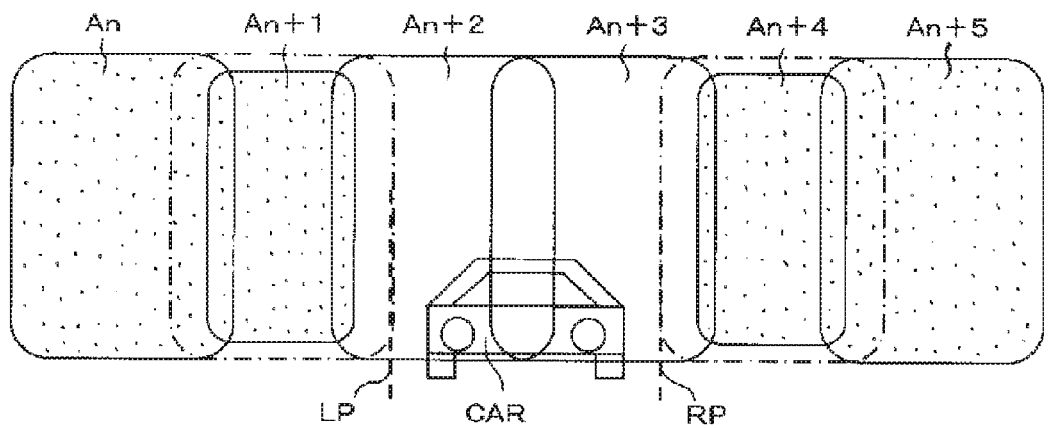

On the other hand, in certain situations, a non-illuminated region that covers both side regions of a vehicle ahead becomes so narrow as to be approximately equal to the region determined by the above-described margins. In the example of FIG. 14(a), two illumination regions An+2 and An+3 are not illuminated to form a non-illuminated region and adjacent illumination regions An+1 and An+4 are close to the left and right ends of a vehicle CAR ahead. Therefore, when the vehicle CAR ahead moves leftward or rightward, dazzling may occur due to the illumination region An+1 or An+4. If comparison between the vehicle ahead and the illumination regions shows the differences between the left end position LP and the right end position RP of the vehicle CAR ahead and the adjacent boundary positions Bo of the illumination regions An+1 and An+4 are smaller than a prescribed value (e.g., about ⅓ of the left-right width of each illumination region), the master lamp ECU 1002 performs a control so as to decrease the luminous intensity of the LEDs corresponding to the illumination regions An+1 and An+4 which are adjacent to the non-illuminated illumination regions An+2 to An+3. As a result, as shown in FIG. 14(b), the luminous intensity distributions of the illumination regions An+1 and An+4 which are located on the two respective sides of the non-illuminated illumination regions An+2 to An+3 shrink and hence these illumination regions narrow in the left-right direction. Thus, the non-illuminated region is widened substantially and dazzling the driver etc. of the vehicle ahead can be prevented reliably.

Figure 15A:
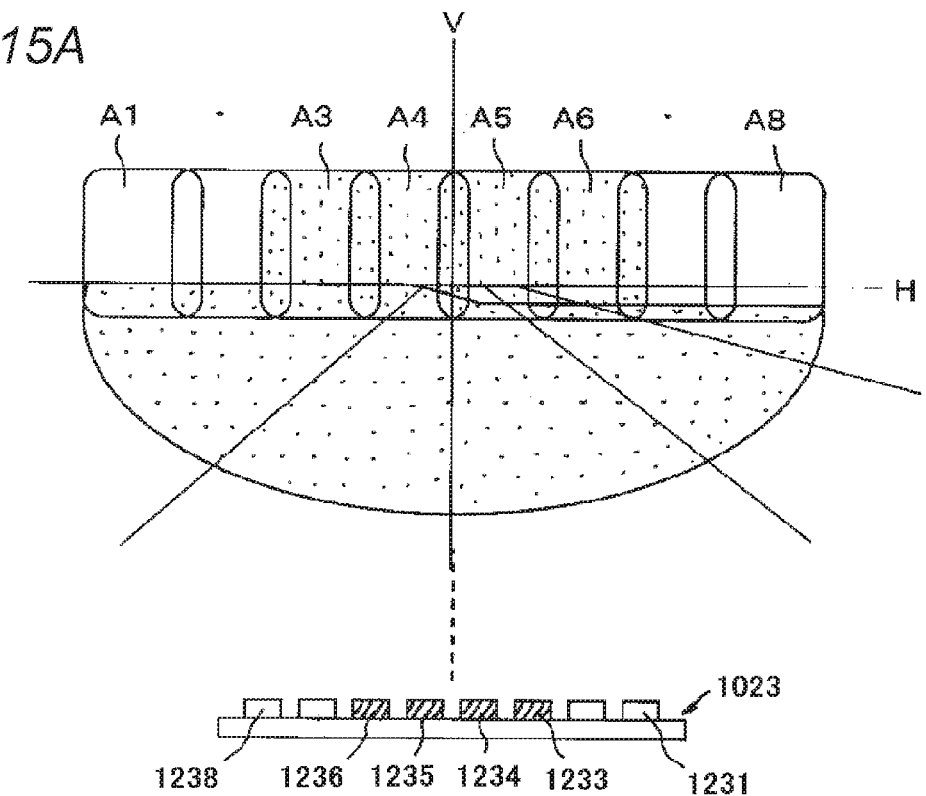
FIG. 15 shows light distribution patterns and the LED array and illustrates example luminous intensity controls for selected illumination regions.

The above-described measure that when part of the LEDs are turned off the currents flowing through other LEDs are increased to increase their luminous intensity levels enables a variable control that is suitable for a running road situation. For example, when the self vehicle is running on a narrow road without any vehicle ahead, as shown in FIG. 15(a), among the LEDs 1231-1238 being lit according to an ADB light distribution control, the four central LEDs 1233-1236 of the LED array are increased in current. At this time, the other LEDs 1231, 1232, 1237, and 1238 are lowered in luminous intensity or all or part of them are turned off. With this measure, an ADB light distribution pattern can be obtained in which the luminous intensity of the four central regions A3-A6 are increased and hence the illuminance of the region right ahead is increased. Thus, the visibility of a region right ahead is increased.

Figure 15B:
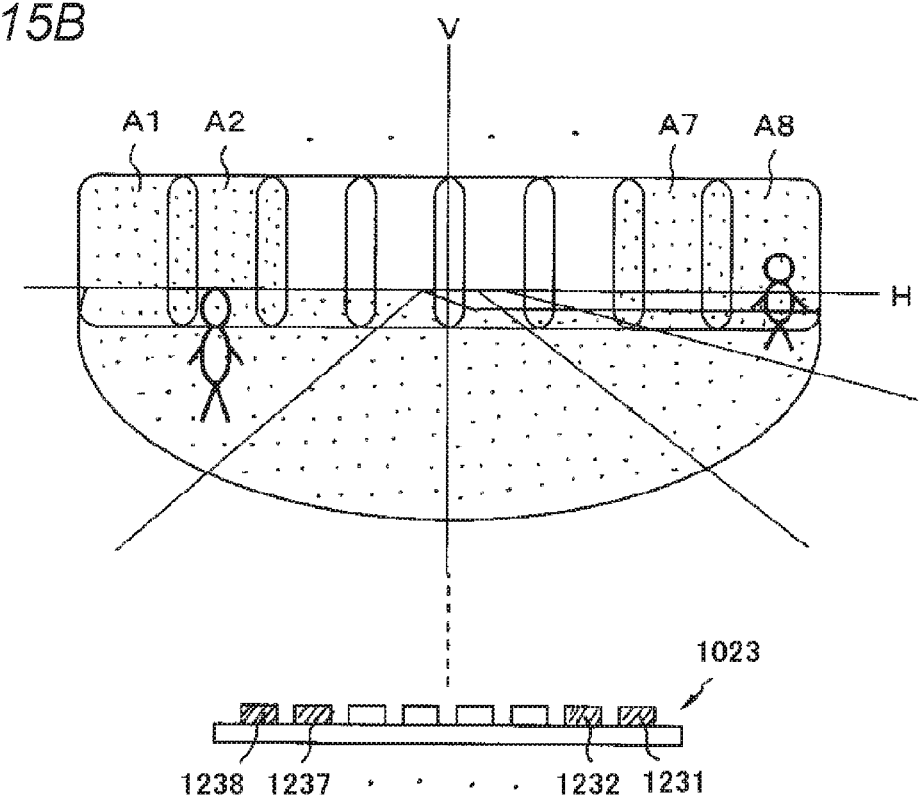

For another example, when the self vehicle is running on a road with many bicycles and pedestrians as in an urban area and its neighborhood, as shown in FIG. 15(b) the currents flowing through the four LEDs 1231, 1232, 1237, and 1238 located at the left and right ends are made somewhat larger than usual to increase their luminous intensity. At this time, the central LEDs 1233-1236 are lowered in luminous intensity or all or part of these LEDs are turned off. With this measure, an ADB light distribution pattern can be obtained in which the illuminance of the illumination regions A1, A2, A7 and A8 located at the two ends of the road is increased, whereby the visibility of pedestrians and shoulder regions of the road can be increased. In either of the cases of FIGS. 15(a) and 15(b), it goes without saying that the luminous intensity of each LED is controlled within the confines of the rated electric energy of the LED array package 1023.

Although no drawings are referred to, it is preferable to increase the luminous intensity of LEDs slowly and to decrease the luminous intensity of LEDs quickly. The same is true of a case of flashing the LEDs. This can prevent the driver etc. from feeling uncomfortable due to abrupt increase of the brightness of a region ahead of the self vehicle. When LEDs are turned off, the driver etc. are less prone to feel uncomfortable due to abrupt decrease of the brightness of part of the illumination regions; instead, this measure is effective in preventing occurrence of dazzling due to delay of turning-off.

Figure 16:
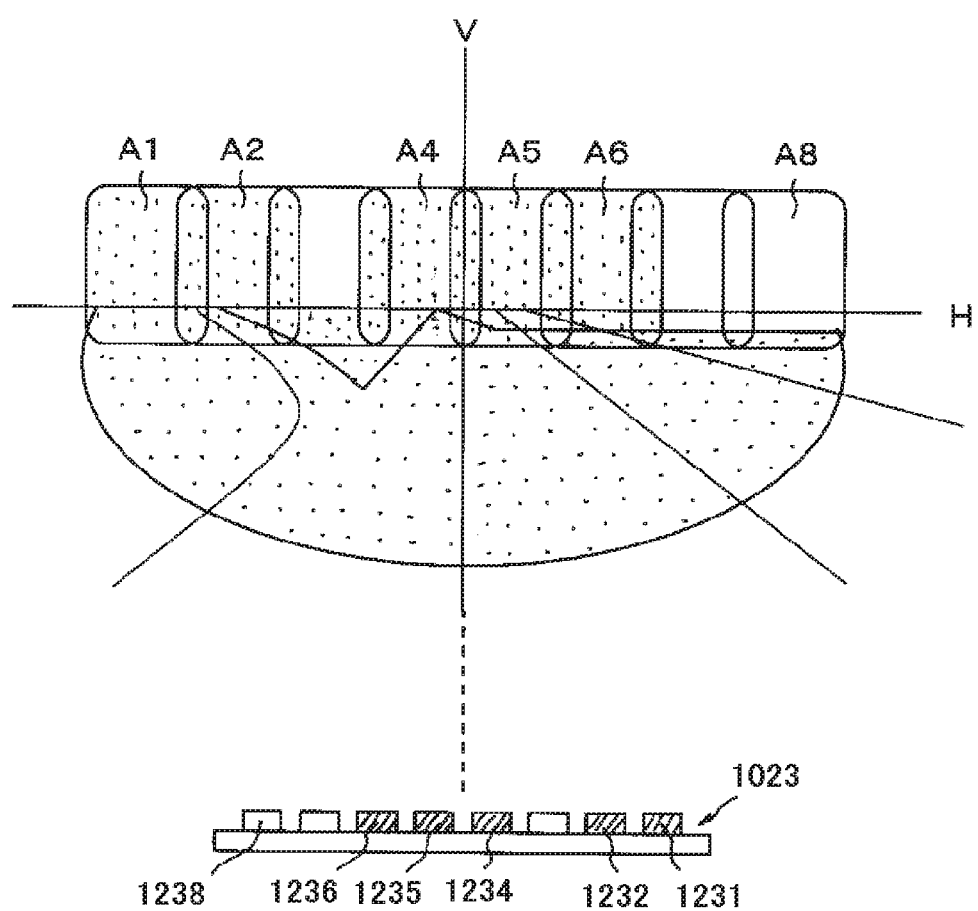
FIG. 16 shows a light distribution pattern and the LED array and illustrates an example luminous intensity control for illumination regions in a case of approaching a branch road.

FIG. 16 shows an example mode in which selected ones of the LEDs 1231-1238 of the LED array package 1023 are lit at a high luminous intensity within the confines of the rated current. As shown in FIG. 16, the luminous intensity of branch-road-side illumination regions is increase when the self vehicle approaches a branch road and is going to change the course toward it. In this example, while the self vehicle is running on a main road, the illumination regions A4-A6 right ahead are illuminated and the other illumination regions A1, A2, A7, and A8 are not illuminated. When the self vehicle approaches a branch road, the luminous intensity of the two branch-road-side illumination regions A1 and A2 is varied periodically at a frequency of about 4 kHz (i.e., they are subjected to flashing). As a result, the luminous intensity of the illumination regions on the front-left of the self vehicle is varied periodically, which makes it possible to arouse attention of other vehicles to, that is, has them recognize, a course change of the self vehicle. In this case, the luminous intensity of illumination regions may be varied periodically in a manner that is close to flashing. In this mode, by changing the luminous intensity of illumination regions in a luminous intensity range that does not dazzle the driver etc. of other vehicles or subjecting illumination regions to flashing in making a left or right turn at an intersection in an urban area, it is possible to arouse attention of pedestrians and bicycle riders and thereby enhance the safety further.

The above-described feature of varying the luminous intensity of selected part of the illumination regions or subjecting them to flashing may also employed in a case that no non-illuminated region is formed in an ADB light distribution pattern, that is, all of the illumination regions are kept illuminated. In this case, it is appropriate to select and make darker illumination regions that are low in the degree of contribution to illumination. The mode of varying the luminous intensity of selected illumination regions periodically or subjecting them to flashing periodically may be started in response to a switching manipulation of the driver or realized under the control of the master lamp ECU 1002 on the basis of a shot image taken by the imaging device 1005 or road information supplied from a navigation apparatus. In certain situations, attention may be aroused by a voice using the audio function of a navigation apparatus. In particular, where in making a course change toward a branch road or a left or right turn at an intersection attention is aroused to the course change by subjecting illumination regions to flashing (i.e., visually) and, at the same time, using a voice, arousing attention to the course change can be made auditorily, which is more effective for a safe drive, Although in the embodiment an ADB light distribution pattern is formed by forming eight illumination regions by the eight LEDs, the invention is not limited to the case of forming such an ADB light distribution pattern. The pattern shape of each illumination region, the number of LEDs, and the number of illumination regions may be set to a desired shape and numbers. Furthermore, the invention is not limited to headlamps for which an ADB light distribution control is performed. In a headlamp that is equipped with plural light sources and performs illumination in a prescribed light distribution pattern by combining illumination regions corresponding to the respective light sources, the invention can be implemented by turning off part of the plural light sources or increasing the luminous intensity of or flashing the other part. Still further, the term "light quantity reduction" as used in the invention means lowering the luminous intensity and it goes without saying that this includes lowering the luminous intensity to zero (turning-off).

Embodiment 3

Figure 17:
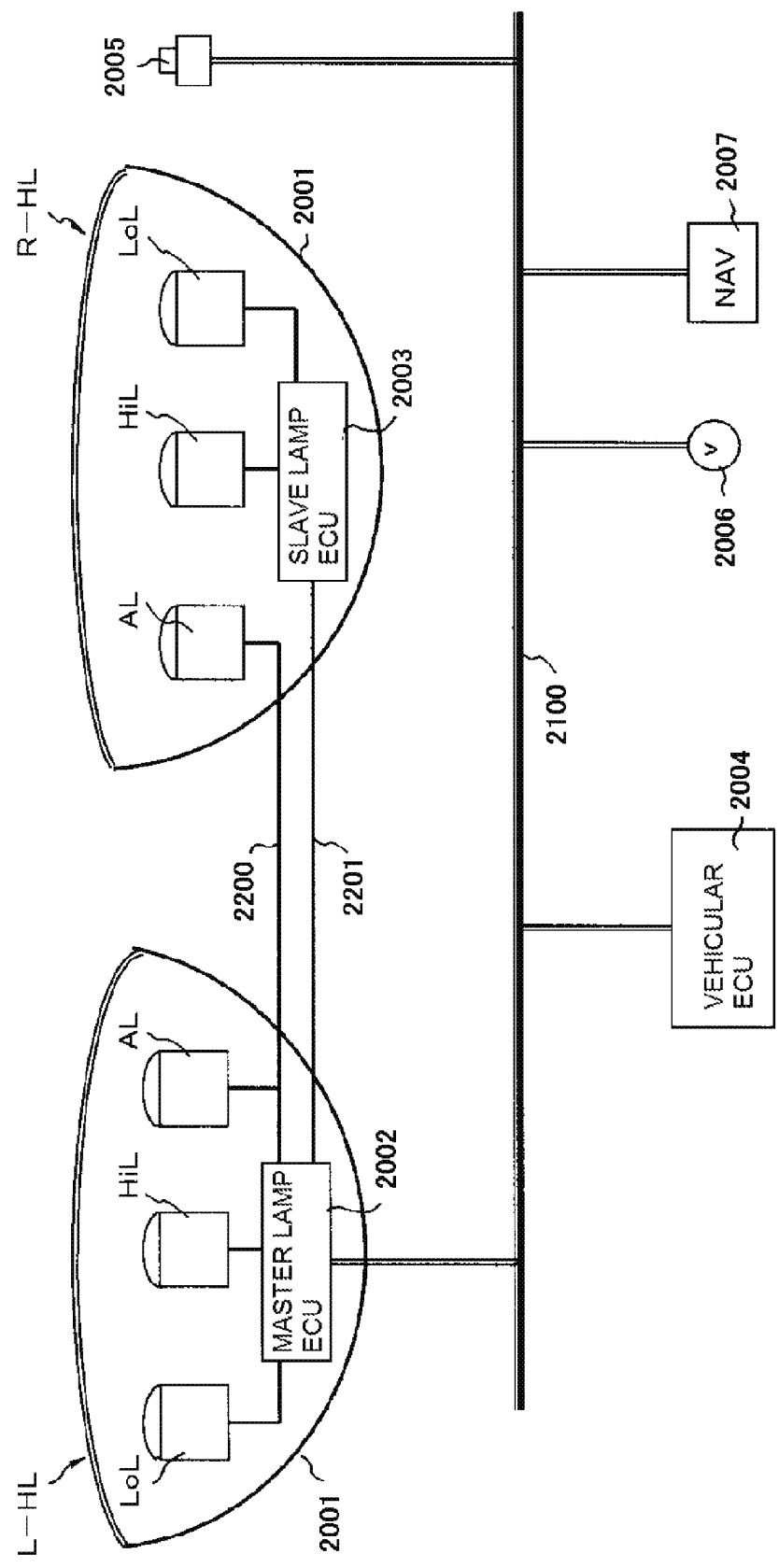
FIG. 17 is a schematic vertical sectional view of headlamps which are provided with a further light distribution control device according to the embodiment.
Figure 18A:
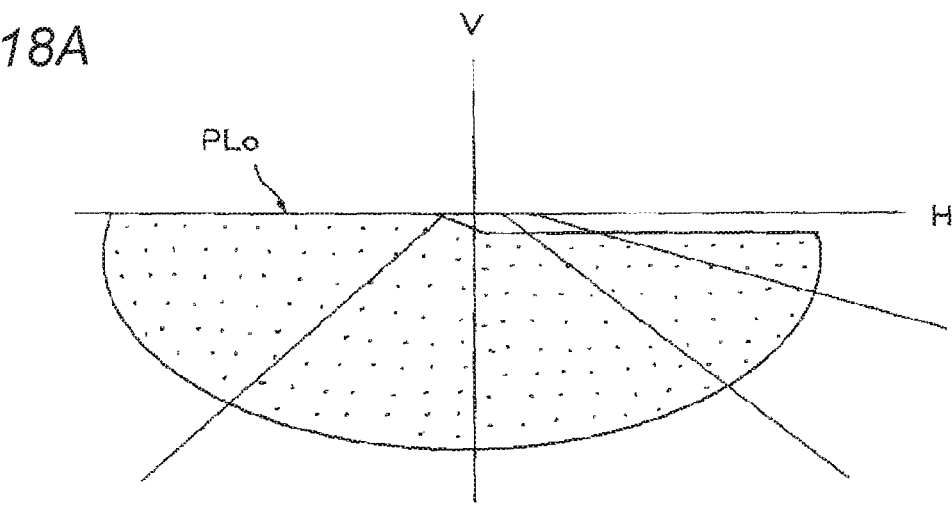
FIG. 18 shows low-beam, high-beam, and ADB light distribution patterns.
Figure 18B:
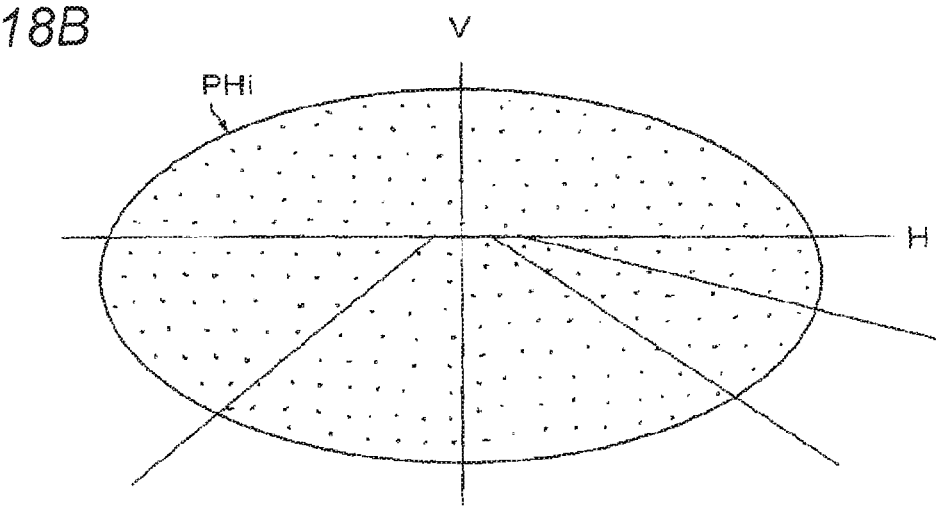

Next, a further embodiment of the invention will be described with reference to the drawings. FIG. 17 is a conceptual diagram showing the configuration of vehicular headlamps to which an ADB light distribution control according to the invention is applied. A left headlamp L-HL and a right headlamp R-HL which are disposed at front-left and front-right positions of a vehicle body of an automobile have approximately the same configurations. A low-beam lamp unit LoL, a high-beam lamp unit HiL, and an ADB lamp unit AL are disposed in each lamp housing 2001. The low-beam lamp unit LoL and the high-beam lamp unit HiL will not be described in detail. Each lamp unit is a lamp unit in which LEDs (light-emitting diodes) are used as light sources, and emits light toward a region ahead of the self vehicle in a low-beam light distribution pattern PLo shown in FIG. 18(a) or a high-beam light distribution pattern PHi shown in FIG. 18(b) when lit.

Figure 19:
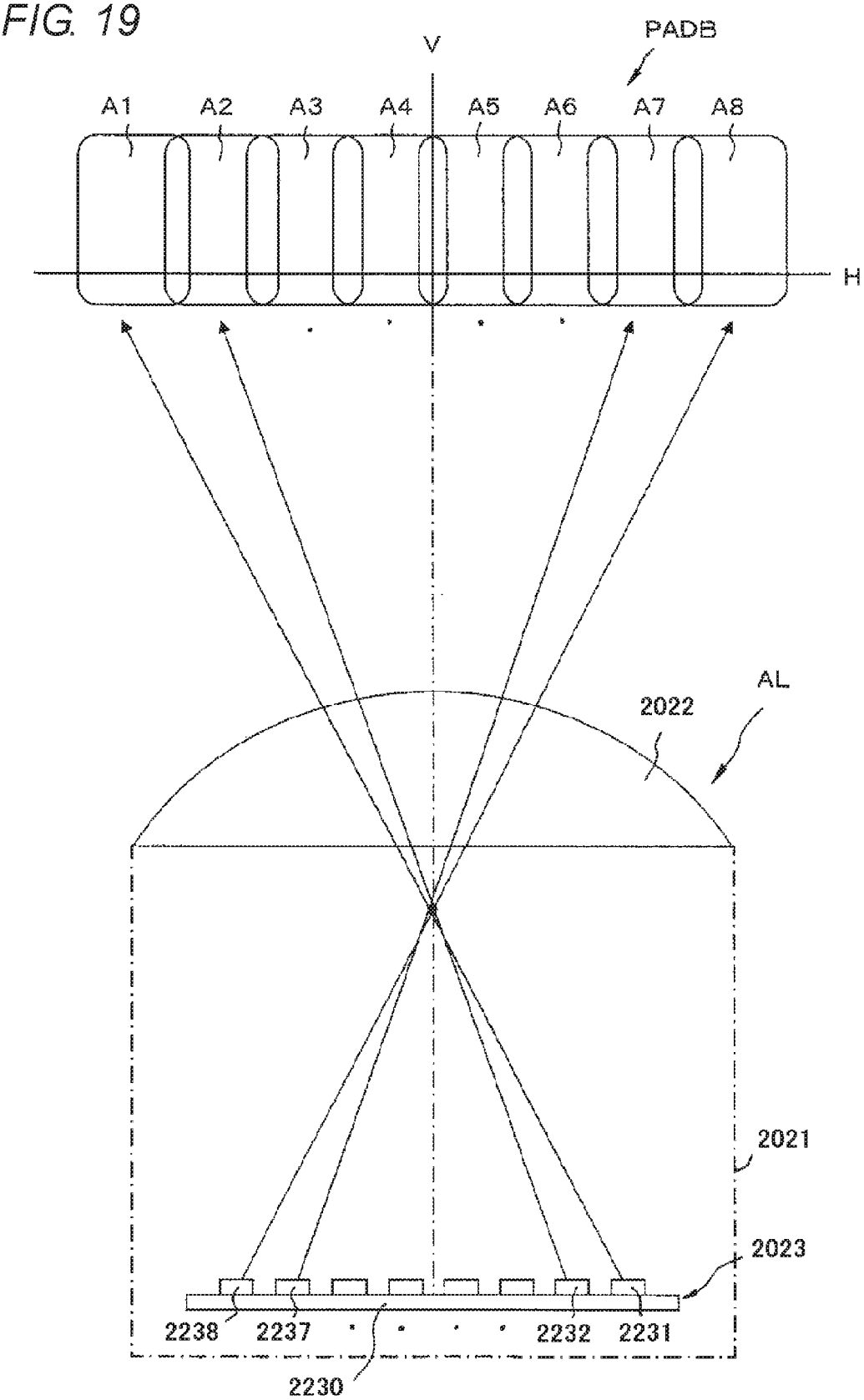
FIG. 19 shows a conceptual configuration of each ADB lamp unit and the ADB light distribution pattern.

As shown in FIG. 19 which is a schematic plan view showing the configuration of each ADB lamp unit AL, an illumination lens 2022 and an LED array package 2023 are disposed inside a unit housing 2021. The LED array package 2023 is installed in a state that plural (in this example, eight) one-chip LEDs (light-emitting diodes) 2231-2238 are arranged in line in the horizontal direction on a base board 2230. Settings are made so that the LEDs 2231-2238 can be lit, turned off, and varied in luminous intensity individually by a lighting circuit (not shown in the figure).

Figure 18C:
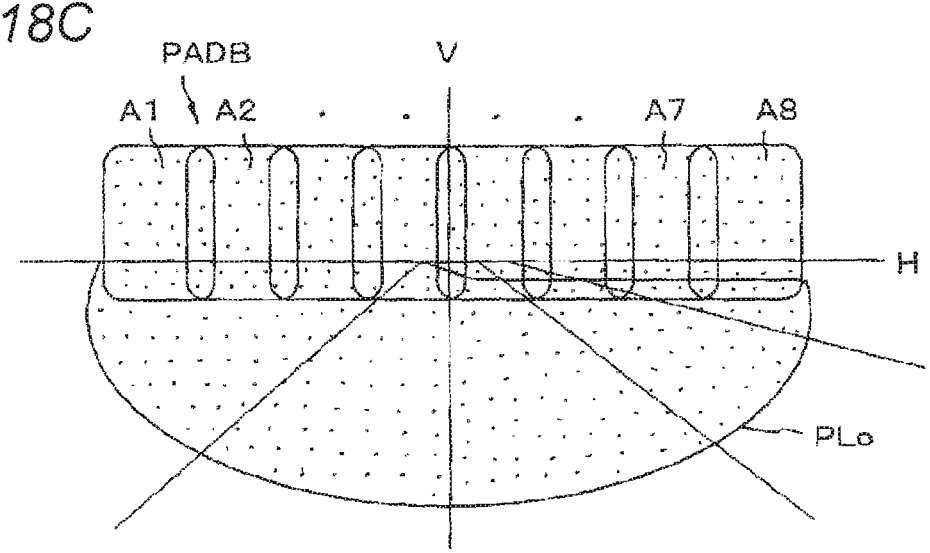

A region ahead of the self vehicle is illuminated with light beams emitted from the respective LEDs 2231-2238 through the illumination lens 2022 in an ADB light distribution pattern PADB. A top part of FIG. 19 is a light distribution pattern diagram showing the ADB light distribution pattern. Prescribed illumination regions A1-A8 are illuminated with light beams coming from the LEDs 2231-2238, respectively, and a long and narrow ADB light distribution pattern PADB extending in the horizontal direction (left-right direction) is formed by overlapping the illumination regions A1-A8 with each other. As shown in FIG. 18(c), the ADB light distribution pattern PADB is a light distribution pattern in which the illumination regions A1-A8 which are illuminated by the eight respective LEDs 2231-2238 are arranged in the horizontal direction above the cutoff line of the low-beam light distribution pattern PLo shown in FIG. 18(a).

As shown in FIG. 17, a master lamp ECU 2002 is disposed in the left headlamp L-HL and a slave lamp ECU 2003 is disposed in the right headlamp R-HL. The master lamp ECU 2002 generates a lighting control signal for controlling the lighting of the low-beam lamp unit LoL, the high-beam lamp unit HiL, and the ADB lamp unit AL of the left headlamp L-HL on the basis of various control signals that are received via a CAN (controller area network) line 2100 of the automobile, and controls the lamp units LoL, HiL, and AL on the basis of the generated lighting control signal. The slave lamp ECU 2003 controls the lighting of the low-beam lamp unit LoL and the high-beam lamp unit HiL of the right headlamp R-HL on the basis of a lighting control signal that is received from the master lamp ECU 2002 via an LIN (local interconnect network) line 2201. On the other hand, the ADB lamp unit AL of the right headlamp R-HL is connected to the master lamp ECU 2002 of the left headlamp L-HL by an LIN line 2200 and is lighting-controlled by the master lamp ECU 2002 together with the ADB lamp unit AL of the left headlamp L-HL.

A vehicular ECU 2004 is connected to the CAN line 2100 to which the master lamp ECU 2002 is connected. The vehicular ECU 2004 outputs, to the CAN line 2100, a lighting control signal for controlling the lighting of the lamp units of the headlamps L-HL and R-HL on the basis of a lighting signal that is sent from a lamp switch (not shown) that is disposed near the driver seat of the automobile. An imaging device 2005 which is installed at a portion of the automobile (in this example, a front portion, located at the center in the vehicle width direction, of the vehicle body of the automobile) and shoots a region ahead of the automobile is connected to the CAN line 2100. When an image signal taken by the imaging device 2005 is output to the CAN line 2100, the vehicular ECU 2004 detects vehicle information such as a position of a vehicle ahead that exists in a region ahead of the self vehicle and a manner of its movement on the basis of the image signal and outputs the detected vehicle information to the CAN line 2100. A vehicle speed sensor 2006 for detecting a vehicle speed of the self vehicle and a navigation apparatus 2007 capable of outputting road information such as whether the road on which the self vehicle is running is an expressway or an urban road are connected to the CAN line 2100, and hence the detected vehicle speed and the road information can be input to the master lamp ECU 2002.

In the headlamps having the above configuration, if a high-beam light distribution control or a low-beam light distribution control is set by, for example, switching of a switch by the driver, the master lamp ECU 2002 lighting-controls the high-beam lamp unit HiL or the low-beam lamp unit LoL of the left headlamp L-HL. At the same time, in the right headlamp R-HL, the slave lamp ECU 2003 receives a signal from the master lamp ECU 2002 and lighting-controls the high-beam lamp unit HiL or the low-beam lamp unit LoL. As a result, illumination is performed in the low-beam light distribution pattern PLo (see FIG. 18(a)) or the high-beam light distribution pattern PHi (see FIG. 18(b)).

On the other hand, if an ADB light distribution control is set by the driver, the vehicular ECU 2004 detects a vehicle ahead that exists in a region ahead of the self vehicle on the basis of an image signal taken by the imaging device 2005 and outputs resulting vehicle information to the CAN line 2100. The master lamp ECU 2002 which is provided in the left headlamp L-HL acquires the vehicle information of the vehicle ahead via the CAN line 2100, performs necessary calculations on the basis of the vehicle information, and generates an ADB lighting control signal. The master lamp ECU 2002 controls the lighting of the respective ADB lamp units AL of the left headlamp L-HL and the right headlamp R-HL on the basis of the generated ADB lighting control signal. If no vehicle is detected ahead at this time, all of the eight LEDs 2231-2238 of each ADB lamp unit AL are lit. As a result, as shown in FIG. 18(c), an ADB light distribution pattern PADB is formed in which eight illumination regions A1-A8 are arranged so as to occupy the whole of a region that extends in the left-right direction and is located above the cutoff line of the low-beam light distribution pattern PLo. In this ADB light distribution control the ADB lamp units AL of the left and right headlamps are lighting-controlled simultaneously by the master lamp ECU 2002.

Figure 20:
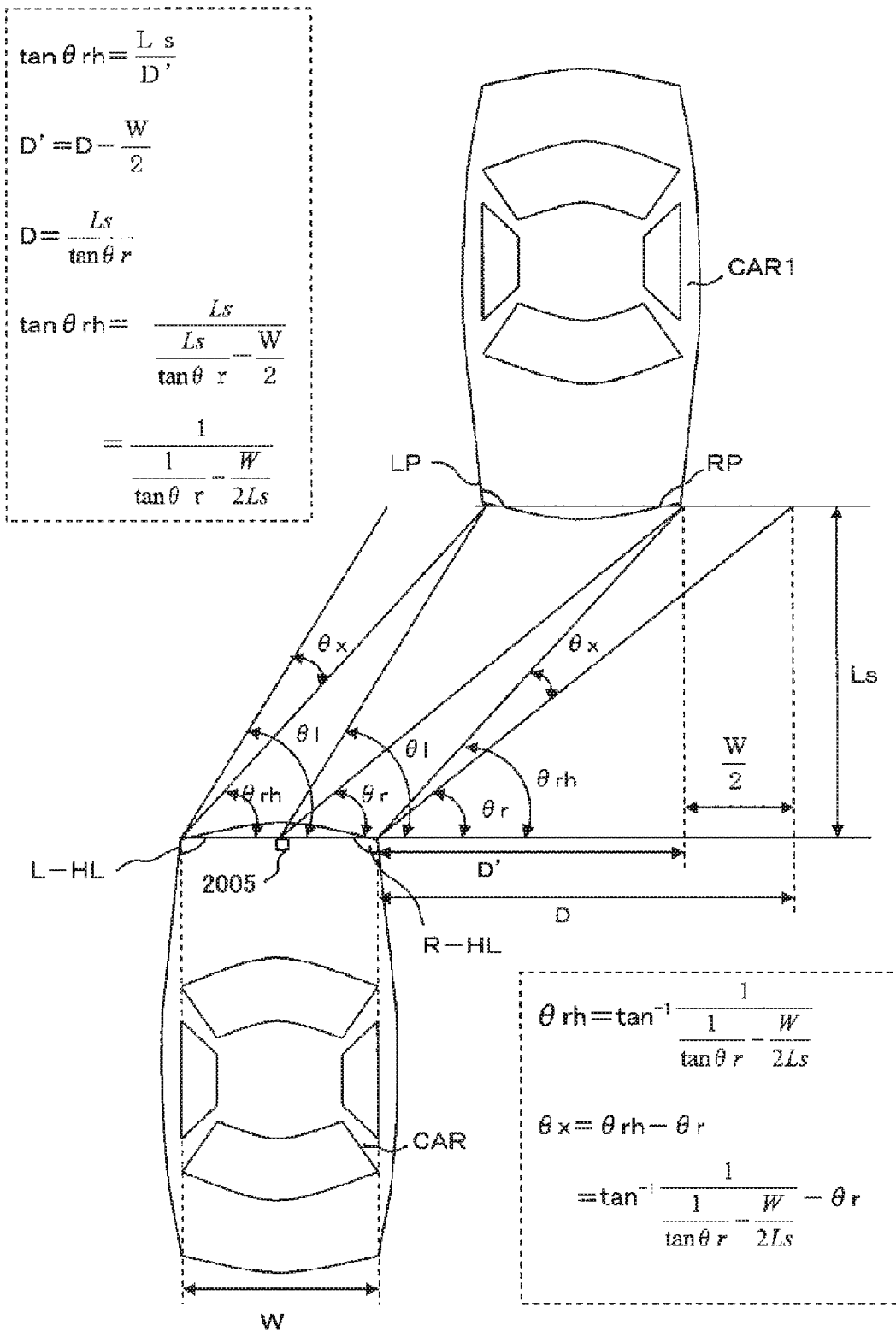
FIG. 20 is a schematic diagram illustrating parallax angles that occur when a vehicle ahead is viewed from an imaging device and the left and right lamps.
Figure 21A:
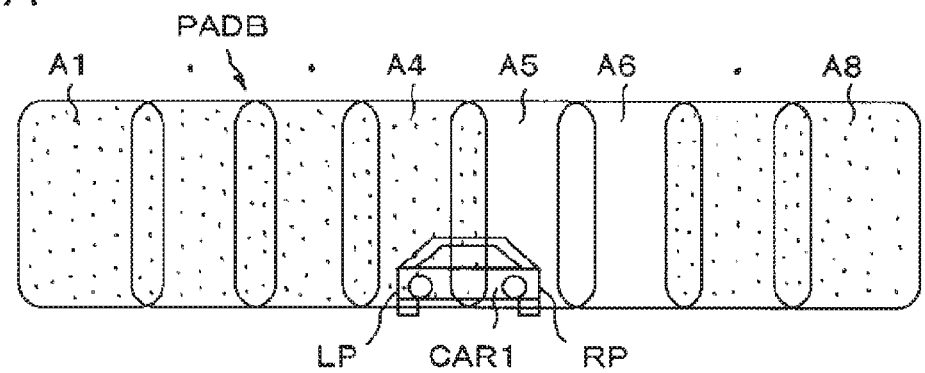
FIG. 21 shows light distribution patterns of ADB light distribution controls for the right headlamp.

On the other hand, if a vehicle CAR1 is detected ahead as shown in a schematic diagram of FIG. 20, in the self vehicle CAR the master lamp ECU 2002 shown in FIG. 17 detects a vehicle position of the detected vehicle CAR1 ahead on the basis of vehicle information of the vehicle ahead that is received from the CAN line 2100 and further detects a right end position RP and a left end position LP of the vehicle ahead on the basis of the vehicle information. The right end position RP and the left end position LP are obtained as a right detection angle θr and a left detection angle θl that are formed by the vehicle width direction of the self vehicle and the lines connecting the imaging device 2005 and the right end position RP and the left end position LP of the vehicle ahead. As shown in FIG. 21(A), the master lamp ECU 2002 compares the detected left end position LP and right end position RP of the vehicle CAR1 ahead with the eight illumination regions A1-A8 which are to form an ADB light distribution pattern PADB, detects illumination regions where the vehicle CAR1 ahead exists, and turns off the LEDs corresponding to the detected illumination regions.

However, as shown in FIG. 20, whereas the right end position RP and the left end position LP are located at the front-right and front-left positions of the vehicle body of the automobile CAR, the imaging device 2005 is disposed approximately at the center in the width direction of the automobile CAR. Therefore, an angle θrh of the line connecting the right headlamp R-HL and the right end position RP of the vehicle CAR1 ahead and an angle θlh of the line connecting the left headlamp L-HL and the left end position LP of the vehicle CAR1 ahead do not coincide with the detected right detection angle θr and left detection angle θl, respectively, and have approximately the same parallax angles θx.

The parallax angles θx depend on a vehicle width W of the self vehicle CAR and an intervehicle distance Ls between the self vehicle CAR and the vehicle CAR1 ahead. As shown in FIG. 20, as for the right detection angle θr, the parallax angle θx is equal to θrh−θr. The angle θrh is calculated according to tan θrh=Ls/D' using a difference D' in the width direction from the vehicle CAR1 ahead and the intervehicle distance Ls. The dimension D' is equal to D−W/2.

Therefore, an equation θrh=tan$^{-1}$[1/{(1/tan θr)−W/2Ls}] is obtained. A similar equation is obtained for the left detection angle θl. The parallax angle θx for the left detection angle θl is approximately equal to that for the right detection angle θr.

Figure 22A:
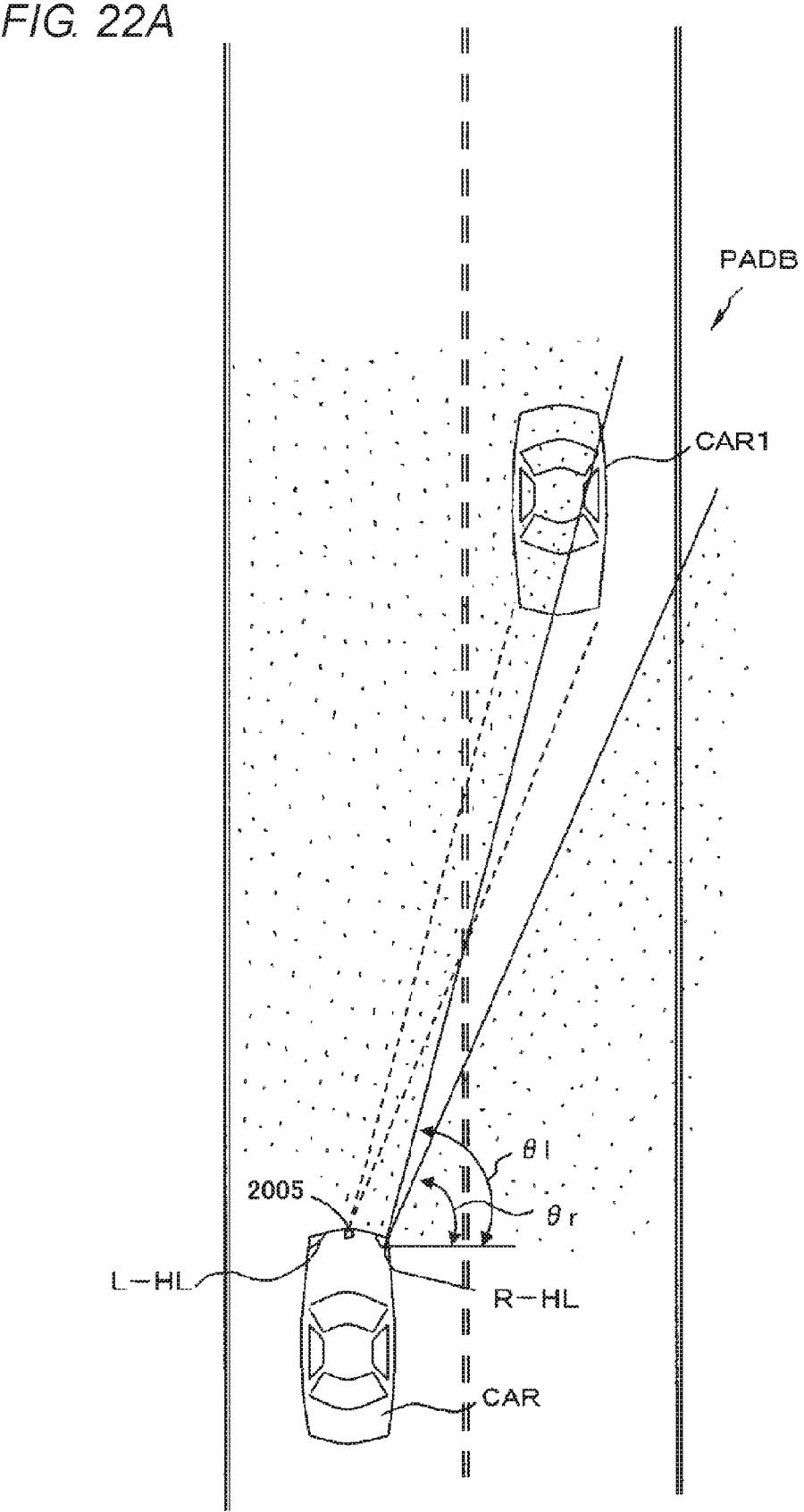
FIG. 22A shows a plan-view light distribution pattern of the right headlamp before a parallax correction.

As seen from the above, if the right end position RP and the left end position LP of the vehicle CAR1 ahead that are determined on the basis of the detected right detection angle θr and left detection angle θl are compared with the eight illumination regions A1-A8, deviations occur that are equal to the parallax angles θx. Therefore, for the right headlamp R-HL, although the LEDs corresponding to the illumination regions A4 and A5 should be turned off, as shown in FIG. 21(A) a light distribution control is performed in such a manner that a non-illuminated region is formed by turning off the LEDs corresponding to the illumination regions A5 and A6 which are deviated rightward by the parallax angle θx from the correct position of the vehicle CAR1 ahead. As a result, the left-side illumination region A4 illuminated by the right headlamp R-HL overlaps with the vehicle CAR1 ahead to dazzle the driver etc. of the vehicle CAR1 ahead. FIG. 22A shows a plan-view light distribution pattern of this case.

Figure 21B:
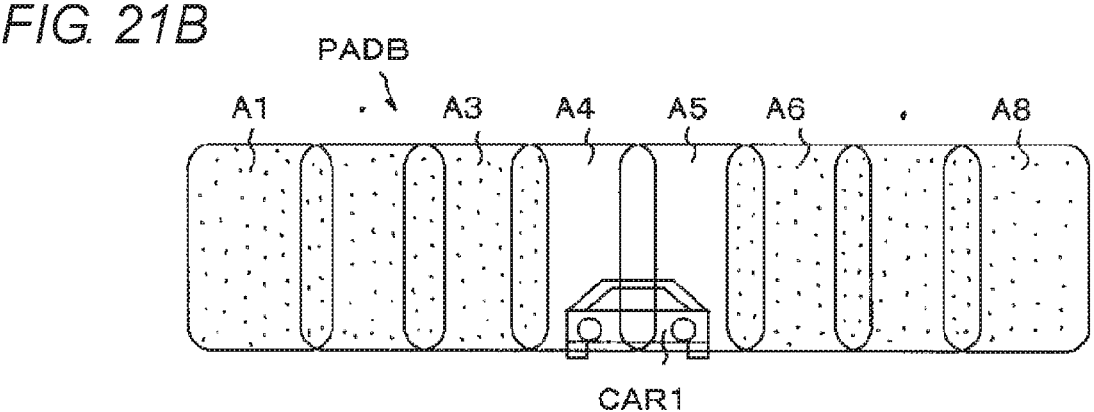
Figure 22B:
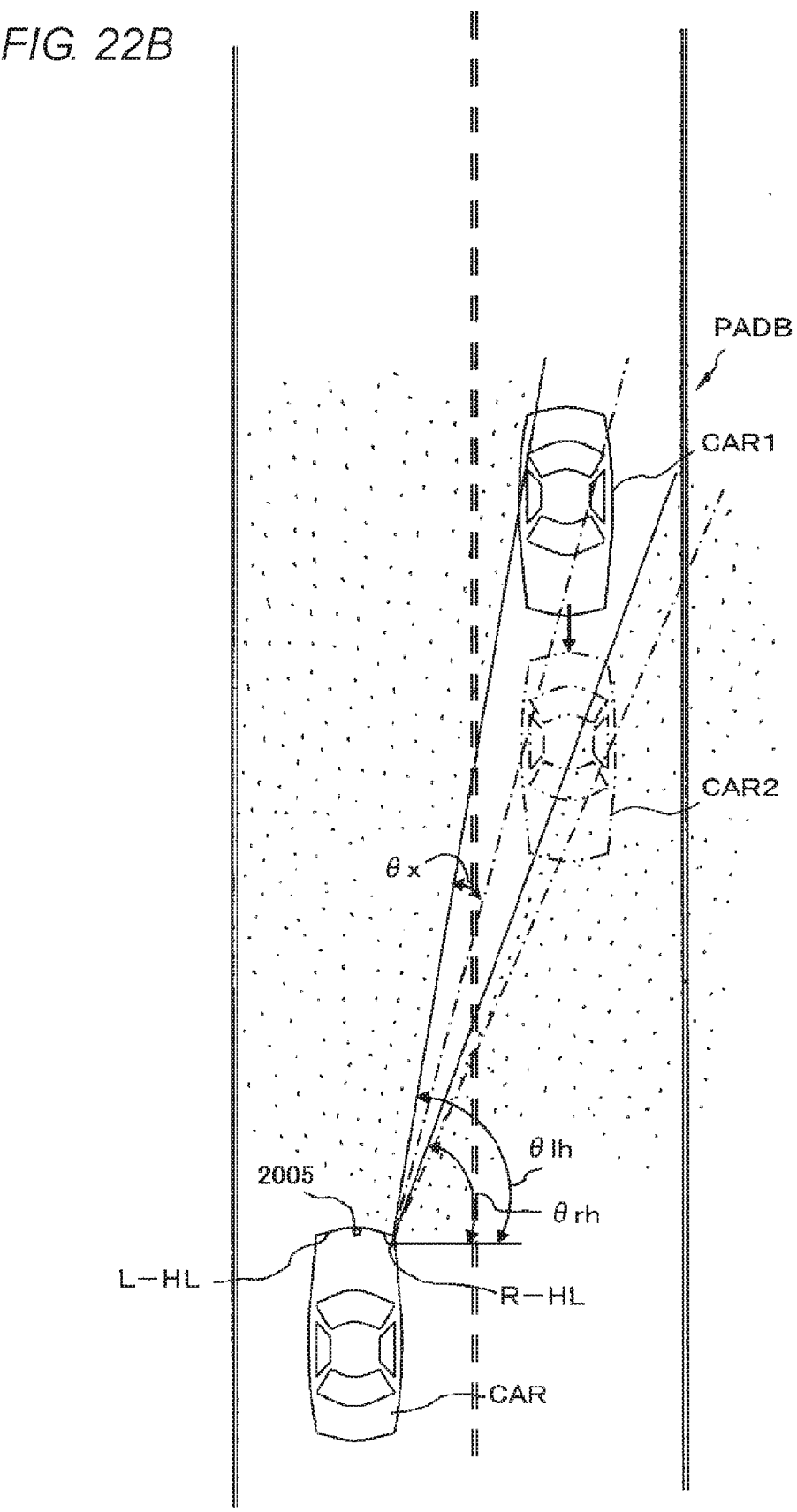
FIG. 22B shows a plan-view light distribution pattern of the right headlamp after the parallax correction.

In view of the above, the master lamp ECU 2002 calculates parallax angles θx according to the above equation and corrects the light distributions on the basis of the calculated parallax angle θx. In the example of FIG. 20, for the detection angle of the right end position RP of the vehicle CAR1 ahead, a correction θr+θx=θrh is made. Likewise, for the detection angle of the left end position LP, a correction θl−θx=θlh is made. As a result, the ADB light distribution control for the right headlamp R-HL is corrected so that as shown in FIG. 21(B) the illumination regions A4 and A5 are not illuminated to form a non-illuminated region, whereby dazzling of the driver etc. of the vehicle CAR1 ahead is prevented. FIG. 22B shows a plan-view light distribution pattern of this case; it is seen that the non-illuminated region is shifted leftward and the driver etc. of the vehicle CAR1 ahead is not dazzled. Chain lines in the same figure show the non-illuminated region before the correction. That is, the use of the parallax errors θx make it possible to position a non-illuminated region with respect to a vehicle CAR1 ahead and enables an ADB light distribution control that is free of dazzling of the driver etc. of the vehicle CAR1 ahead.

As described above, to calculate parallax angles θx as mentioned above in the self vehicle, it is necessary to determine an intervehicle distance LS to a vehicle CAR1 ahead. The intervehicle distance Ls is determined on the basis of an image taken by the imaging device 2005. Since this requires complex calculations, it takes long time to obtain an intervehicle distance and in many cases variations the intervehicle distance to a vehicle ahead that occur at a high frequency cannot be accommodated. And an error tends to occur when a distance to a vehicle ahead is long. One method for solving these problems is to employ a default intervehicle distance. Here the default intervehicle distance is set at 50 m which is an ordinary (average) intervehicle distance between running automobiles. A default parallax angle θx is calculated on the basis of the distance 50 m and an ADB light distribution control is performed using this default parallax angle θx. The default parallax angle θx is usually equal to about 0.7°, and becomes equal to an actual parallax angle when the intervehicle distance is 50 m. In the following, the parallax angle will be represented by θx in either case.

However, an ADB light distribution control is performed on the basis of the default parallax angle θx, a problem may occur when the intervehicle distance to a vehicle CAR1 ahead has varied. For example, in the case of a vehicle CAR2 ahead indicated by two-dot chain line in FIG. 22B, that is, when the vehicle CAR1 ahead has approached the self vehicle in a short time and reached a position whose distance is smaller than the default intervehicle distance, the vehicle CAR2 ahead enters the illumination region immediately on the right of the non-illuminated region and the driver etc. of the vehicle CAR2 ahead is dazzled. In view of this, in the embodiment, in an ADB light distribution control for the right headlamp R-HL, a right detection angle θr is used as it is (i.e., without being corrected) as a right detection angle for determining a right end position RP of a vehicle ahead and correction by the parallax angle θx is performed only for a left detection angle for determining a left end position LP.

Figure 21C:
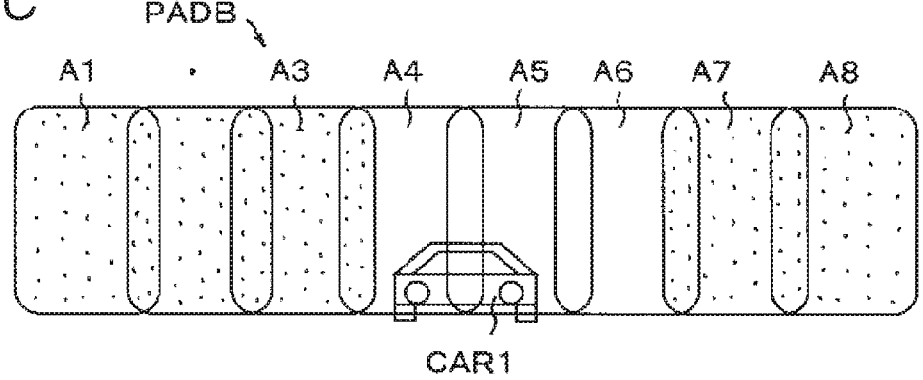
Figure 22C:
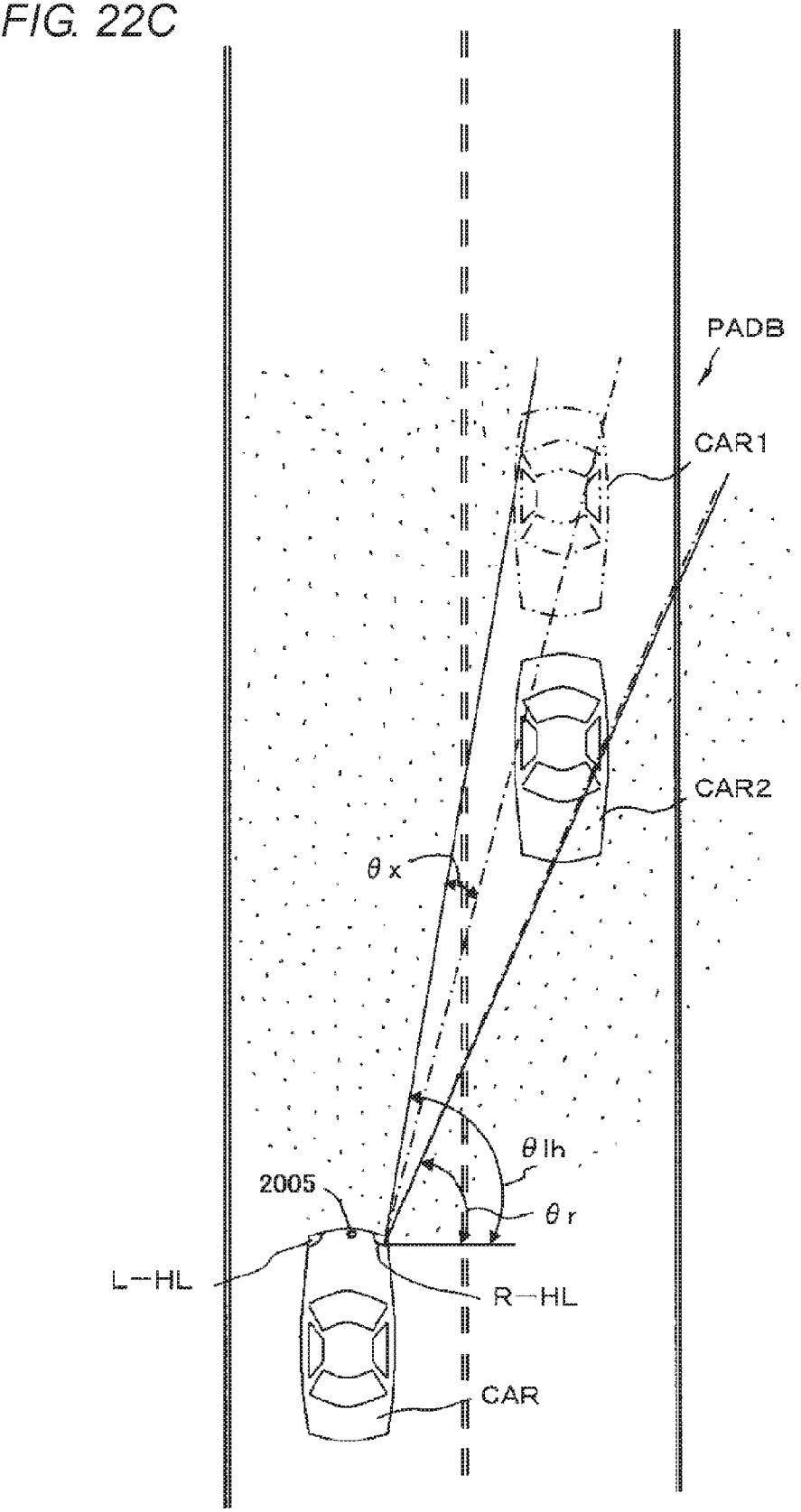
FIG. 22C shows a plan-view light distribution pattern of the right headlamp formed by a light distribution control according to the embodiment.

That is, in the case of the right headlamp R-HL whereas a right detection angle θr is used as it is for outside illumination regions in the width direction of the self vehicle, a left detection angle θlh obtained by correcting a left detection angle θl by the default parallax angle θx is used for inside illumination regions in the width direction. Thus, as shown in FIG. 21(C), an ADB light distribution pattern becomes such that a non-illuminated region is formed on the right side by the illumination regions A5 and A6 on the basis of an original detection angle and a minimum non-illuminated region is formed on the left side by the illumination region A4 through correction by the default parallax angle θx. As a result, the right-side non-illuminated region for the vehicle CAR1 ahead is expanded, whereby occurrence of dazzling can be prevented even when the distance to the vehicle CAR1 ahead becomes small. FIG. 22C shows a plan-view light distribution pattern of this case.

An ADB light distribution pattern PADB formed through correction by the default parallax angle θx becomes such that a non-illuminated region is formed by not illuminating illumination regions where a vehicle CAR1 ahead exists among all the illumination regions. As described above, on the right side of the vehicle CAR1 ahead, since illumination regions are not illuminated on the basis of a right detection angle θr of the vehicle CAR1 ahead, an expanded non-illuminated region is formed using a parallax angle θx between the imaging device 2005 and the right headlamp R-HL. On the other hand, on the left side of the vehicle CAR1 ahead, since a left detection angle θl is corrected by the default parallax angle θx (increased leftward), a non-illuminated region is formed by not illuminating an illumination region that includes a detected left end position of the vehicle CAR1 ahead. With this measure, even if the intervehicle distance to a vehicle ahead varies in a short time, dazzling of the driver etc. of the vehicle ahead can be prevented. On the other hand, the non-illuminated region is made as small as possible, whereby the visibility of the vehicle ahead can be increased.

Figure 23A:
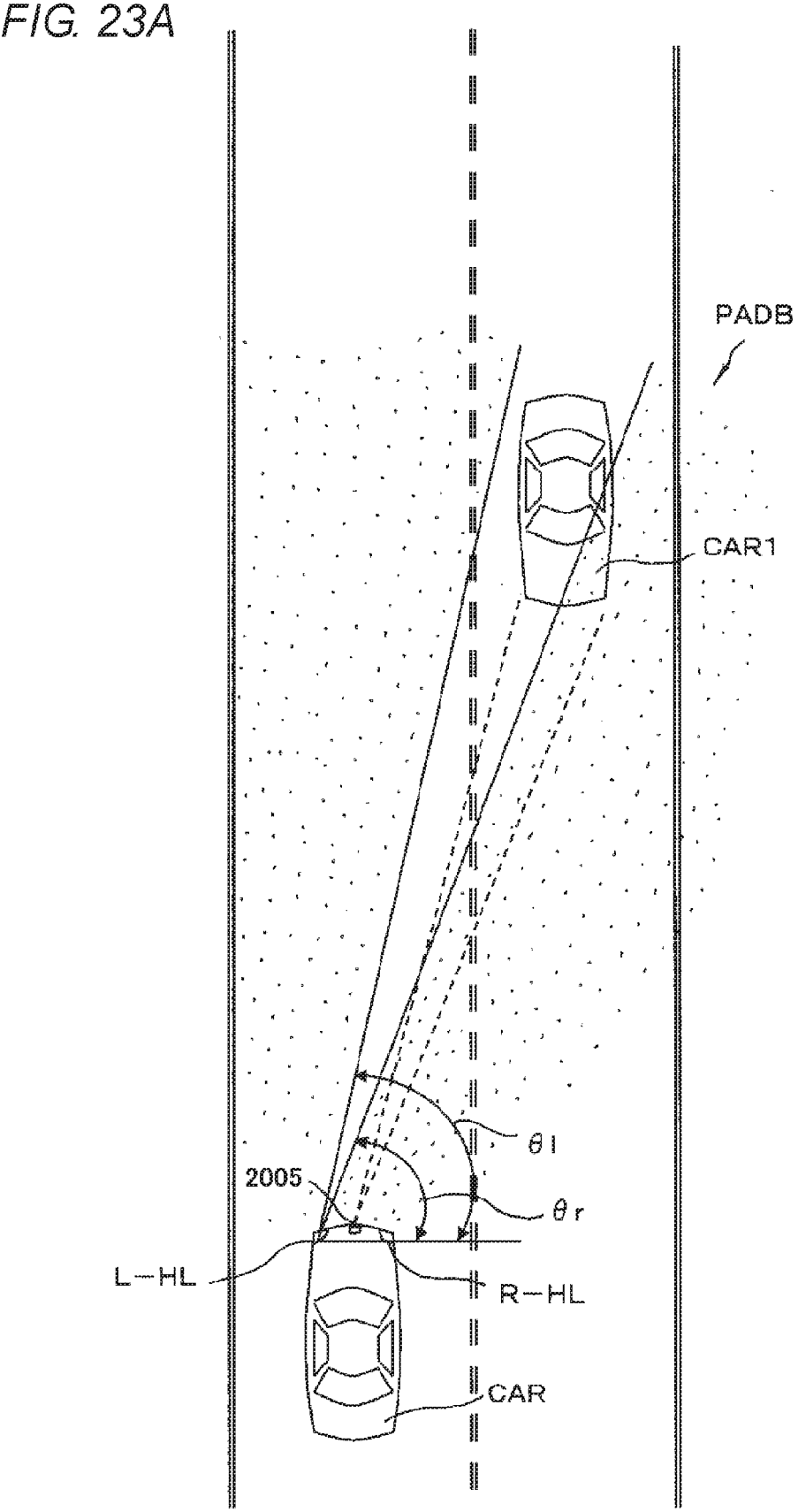
FIG. 23A shows a plan-view light distribution pattern of the left headlamp before a parallax correction.
Figure 23B:
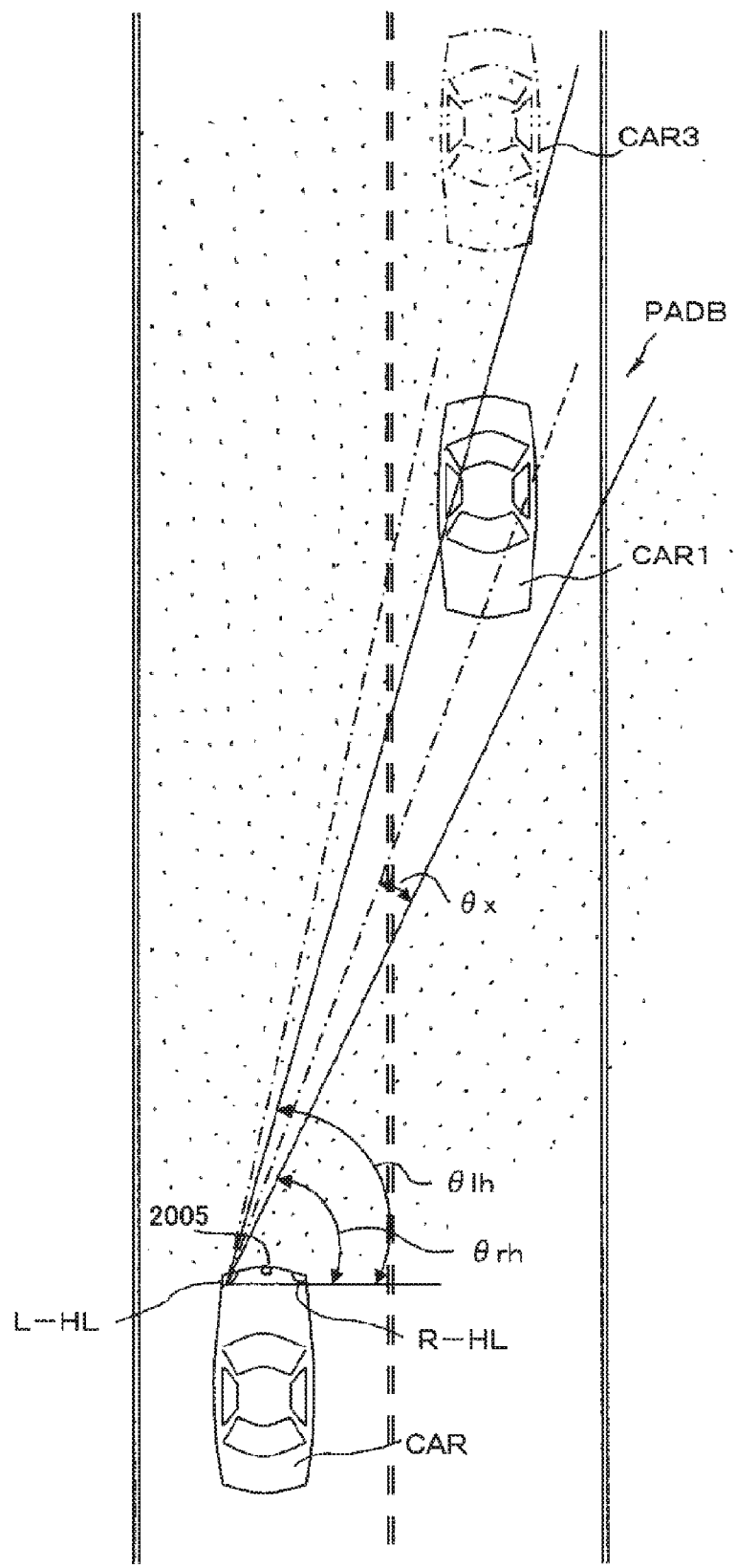
FIG. 23B shows a plan-view light distribution pattern of the left headlamp after the parallax correction.

A similar control is performed for the left headlamp. In an ADB light distribution control, if a left detection angle θl is corrected by the parallax angle θx, an ADB light distribution pattern PADB is shifted rightward as a whole by the parallax angle θx from a state of FIG. 23A to a state of FIG. 23B, whereby the vehicle CAR1 ahead enters a non-illuminated region correctly. Thus, an ADB light distribution control is possible with which dazzling of the driver etc. of the self vehicle CAR vehicle CAR1 ahead can be prevented. However, in this case, as indicated by two-dot chain lines in FIG. 23B, a vehicle CAR3 ahead that was the vehicle CAR1 ahead at a time a prescribed time before or another vehicle ahead that is located behind the vehicle CAR1 ahead enters the left-side illuminated region, as a result of which the driver etc. of the vehicle CAR3 ahead is dazzled.

Figure 23C:
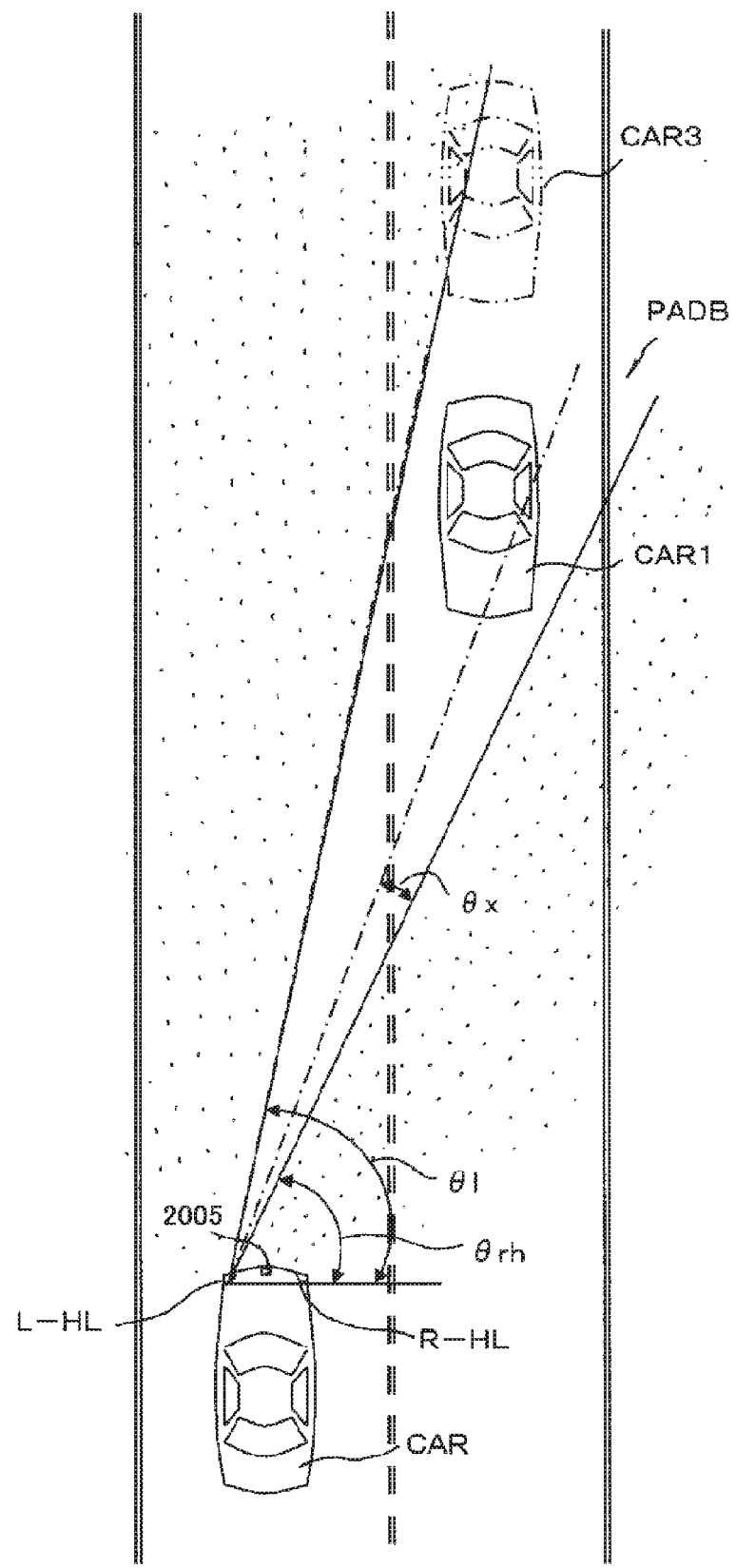
FIG. 23C shows a plan-view light distribution pattern of the left headlamp formed by a light distribution control according to the embodiment.

In view of the above, in an ADB light distribution control for the left headlamp L-HL, a left detection angle θl is used as it is for left-side illumination regions, that is, outside illumination regions in the width direction of the self vehicle, a right detection angle θrh obtained by correcting a right detection angle θr by the default parallax angle θx is used for right-side illumination regions, that is, inside illumination regions in the width direction of the self vehicle. Thus, as shown in FIG. 23C, an ADB light distribution pattern PADB becomes such that on the left side of the vehicle CAR1 ahead a non-illuminated region is expanded leftward by the default parallax angle θx and a right-side non-illuminated region is expanded rightward. As a result, occurrence of dazzling of the driver etc. of the following vehicle CAR3 ahead can be prevented.

As a result of the above-described light distribution controls for the left and right headlamps, a total light distribution pattern of the automobile CAR is a superimposition of the above-described light distribution patterns of the left and right headlamps. However, the non-illuminated regions of the left and right headlamps are approximately the same, the illumination light of either of the left and right headlamps does not cause dazzling of the driver etc. of a vehicle ahead. Furthermore, since the non-illuminated region(s) is controlled so as to be as narrow as possible, the visibility of a region ahead of the self vehicle can be increased.

As for the detection of a left end position and a right end position of a vehicle ahead by the master lamp ECU 2002, a value obtained by taking into consideration various kinds of errors such as an error of a position of attachment, to the vehicle, of the imaging device 2005, a calculation error that occurs when the vehicular ECU 2004 or the master lamp ECU 2002 calculates a vehicle position, and an illumination region setting error due to a setting error of the lamp optical axis of the headlamp, in particular, the ADB lamp unit AL may be added to each of a left end position and a right end position obtained from an image taken by the imaging device 2005 so that positions that are located somewhat on the left and right of actual left and right positions are detected as left and right positions. As a result, an ADB light distribution control can be realized that is not affected by the above various kinds of errors.

Although in the embodiment the default parallax angle θx is set fixedly on the basis of the default intervehicle distance, the default parallax angle θx may be varied on the basis of vehicle speed information supplied from the vehicle speed sensor 2006 or road information supplied from the navigation apparatus 2007. More specifically, the default parallax angle θx is set at a small angle when the vehicle speed is higher than a prescribed speed or it is judged that the self vehicle is running on an expressway. While the self vehicle is running at a high speed or on an expressway, the intervehicle distance to a vehicle ahead is large, a right detection angle and a left detection angle are small, and the frequency of approach of a vehicle ahead and the probability that a vehicle ahead moves leftward or rightward to a large extent are low. Therefore, the degree of expansion of an inside (in the vehicle width direction) non-illuminated region by the parallax angle θx is lowered to give priority to the visibility of a region ahead of the self vehicle. On the other hand, the default parallax angle θx is set at a large angle when the self vehicle is running at a low speed or in an urban area. While the self vehicle is running at a low speed or in an urban area, the intervehicle distance to a vehicle ahead is small, a right detection angle and a left detection angle are small, and the frequency of approach of a vehicle ahead and the probability that a vehicle ahead moves leftward or rightward to a large extent are high. Therefore, non-illuminated regions on the left and right of a vehicle ahead are set as wide as possible to give priority to the prevention of dazzling of the driver etc. of a vehicle ahead.

In this connection, it is possible to set plural different intervehicle distances as default intervehicle distances and calculate and store plural default parallax angles corresponding to the respective intervehicle distances in advance, and select one of these default parallax angles on the basis of a detected vehicle speed or road information. This makes it possible to realize a finer ADB light distribution control.

Although in the embodiment a non-illuminated region is formed by not illuminating illumination regions where a vehicle ahead exists, a non-illuminated region may be formed by lowering the luminous intensity of such illumination regions. It goes without saying that the luminous intensity should be lowered to such a value as not to dazzle the drive etc. of a vehicle ahead even if they are illuminated. Furthermore, although in the embodiment an ADB light distribution pattern is formed by forming eight illumination regions by the eight LEDs, the invention is not limited to the case of forming such an ADB light distribution pattern. The pattern shape of each illumination region, the number of LEDs, and the number of illumination regions may be set to a desired shape and numbers.

Still further, the invention is not limited to headlamps for which an ADB light distribution control is performed by forming plural illumination regions by plural light sources and reducing the light quantity of selected ones of these illumination regions. The invention can be applied to headlamps that enable a light distribution control in such a manner that part of illumination regions can be selected as a non-illuminated region in each of the left and right headlamps. For example, the invention can be applied to headlamps in which a control can be made so that each of non-illuminated regions located outside and inside in the vehicle width direction is varied by switching between shades having different shapes in each of the left and right headlamps.

Although the invention has been described in detail by referring to the particular embodiments, it is apparent to those skilled in the art that various changes and modifications are possible without departing from the spirit and scope of the invention.

The present application is based on Japanese Patent Application No. 2013-145109 filed on Jul. 11, 2103, No. 2013-145110 filed on Jul. 11, 2103, and No. 2013-145111 filed on Jul. 11, 2103, the disclosures of which are incorporated herein by reference.

INDUSTRIAL APPLICABILITY

The invention can be applied to ADB light distribution control in which an ADB light distribution pattern is formed by plural illumination regions and the lighting state of each illumination region is controlled according to a result of detection of a vehicle ahead.

DESCRIPTION OF SYMBOLS

1: Lamp housing
2: Master lamp ECU
3: Slave lamp ECU
4: Vehicular ECU
5: Imaging device
6: Acceleration sensor
21: Unit housing
22: Illumination lens 23: LED array package
100: LAN line
200, 201: LIN line
231-238: LEDs
R-HL: Right headlamp
L-HL: Left headlamp
LoL: Low-beam lamp unit
HiL: High-beam lamp unit
AL: ADB lamp unit
A1-A8, An to An+5: Illumination regions
LP: Left end position, corrected left end position (of vehicle ahead)
RP, aRP: Right end position, corrected right end position (of vehicle ahead)
LB, RB: Left boundary position, right boundary position (of illumination region)
1001: Lamp housing
1002: Master lamp ECU (light distribution controller)
1003: Slave lamp ECU
1004: Vehicular ECU
1005: Imaging device
1021: Unit housing
1022: Illumination lens
1023: LED array package
1100: LAN line
1200, 1201: LIN line
1231-1238: LEDs
1241-1248: Unit reflectors
R-HL: Right headlamp
L-HL: Left headlamp
LoL: Low-beam lamp unit
HiL: High-beam lamp unit
AL: ADB lamp unit
A1-A8: Illumination regions
LP: Left end position (of vehicle ahead)
RP: Right end position (of vehicle ahead)
LB, RB: Left boundary position, right boundary position (of illumination region)
2001: Lamp housing
2002: Master lamp ECU (light distribution controller)
2003: Slave lamp ECU
2004: Vehicular ECU
2005: Imaging device
2006: Vehicle speed sensor
2007: Navigation apparatus
2021: Unit housing
2022: Illumination lens
2023: LED array package
2100: LAN line
2200, 2201: LIN line
2231-2238: LEDs
R-HL: Right headlamp
L-HL: Left headlamp
LoL: Low-beam lamp unit
HiL: High-beam lamp unit
AL: ADB lamp unit
A1-A8: Illumination regions
LP: Left end position (of vehicle ahead)
RP: Right end position (of vehicle ahead)
θx: Parallax angle (default parallax angle)
θr, θrh: Right detection angle, corrected right angle (angle as viewed from right headlamp)
θl, θlh: Left detection angle, corrected left angle (angle as viewed from left headlamp)

The invention claimed is:

1. A light distribution control method for a vehicular headlamp in which plural illumination regions are arranged in the left-right direction and illuminated by a headlamp in a desired light distribution pattern, and vehicle positions of a vehicle ahead are detected and selected ones of the plural illumination regions are reduced in light quantity according to the detected vehicle positions, wherein:
corrected vehicle positions are set that are obtained by adding margins to the detected vehicle positions in the left and right directions, respectively, illumination regions where the vehicle ahead exists are detected on the basis of the corrected vehicle positions, and the detected illumination regions are reduced in light quantity.

2. A light distribution control device for a vehicular headlamp, comprising:
a headlamp which illuminates, in a desired light distribution pattern, plural illumination regions arranged in the left-right direction for illumination of a region ahead;
vehicle ahead detector which detects vehicle positions of a vehicle ahead; and
light distribution controller which reduces selected ones of the plural illumination regions in light quantity according to the detected vehicle positions, wherein:
the light distribution controller sets corrected vehicle positions by adding margins to the detected vehicle positions in the left and right directions, respectively, detects illumination regions where the vehicle ahead exists on the basis of the corrected vehicle positions and reduces the detected illumination regions in light quantity.

3. The light distribution control device for a vehicular headlamp according to claim 2, wherein the light distribution controller detects position variations of the vehicle positions, and increases or decreases the margins according to temporal variation rates of the position variations.

4. The light distribution control device for a vehicular headlamp according to claim 3, wherein the light distribution controller increases a margin in a direction in which the vehicle positions vary as the variation rates of the position variations increase.

5. The light distribution control device for a vehicular headlamp according to claim 3, wherein the light distribution controller increases the margins quickly and decreases the margins slowly.

6. A light distribution control device for a vehicular headlamp, comprising:
a headlamp which illuminates, in a desired light distribution pattern, plural illumination regions arranged in the left-right direction;
vehicle ahead detector which detects a vehicle ahead; and
light distribution controller which reduces selected ones of the plural illumination regions in light quantity according to the detected vehicle positions, wherein:
the light distribution controller is configured so as to be able to set boundary positions of each of the plural illumination regions at different positions according to a type of the detected vehicle ahead on the basis of a luminous intensity distribution of each of the plural illumination regions.

7. The light distribution control device for a vehicular headlamp according to claim 6, wherein the light distribution controller detects whether the vehicle ahead is a forward vehicle running in the same direction or an ongoing vehicle, and sets the boundary positions at different positions depending on whether the vehicle ahead is a forward vehicle running in the same direction or an ongoing vehicle.

8. The light distribution control device for a vehicular headlamp according to claim 6, wherein the light distribution controller performs a control of increasing the luminous intensity of other illumination regions when reducing part of the plural illumination regions in light quantity.

9. The light distribution control device for a vehicular headlamp according to claim 8, wherein the light distribution controller increases the luminous intensity using electric energy saved by the reduction in light quantity.

10. The light distribution control device for a vehicular headlamp according to claim 6, wherein the light distribution controller increases or decreases the luminous intensity of illumination regions that are adjacent to the light-quantity-reduced illumination regions.

11. The light distribution control device for a vehicular headlamp according to claim 6, wherein the light distribution controller varies, periodically, the luminous intensity of a left or right end illumination region of the plural illumination regions and an illumination region or regions neighboring it.

12. A light distribution control device for a vehicular headlamp, comprising:
    a headlamp disposed in at least a portion, in the vehicle width direction, of a vehicle;
    vehicle detector which is disposed at a different position in the vehicle width direction than the headlamp and detects a vehicle ahead; and
    light distribution controller which controls a light distribution of the headlamp on the basis of a vehicle position of the detected vehicle ahead, wherein:
    the light distribution controller is configured so as to be able to perform a light distribution control to form a non-illuminated region for preventing dazzling of persons in the vehicle ahead on the basis of the vehicle position of the detected vehicle ahead, to perform a light distribution control on the basis of the detected vehicle position for illumination regions outside the non-illuminated region in the vehicle width direction, and to perform a light distribution control on the basis of a vehicle position that is corrected for a parallax angle between the headlamp and the vehicle detector, for illumination regions inside the non-illuminated region in the vehicle width direction.

13. The light distribution control device for a vehicular headlamp according to claim 12, wherein the light distribution control for the outside illumination regions in the vehicle width direction is performed on the basis of a vehicle position obtained when the vehicle ahead is detected from the vehicle detector and the light distribution control for the inside illumination regions in the vehicle width direction is performed on the basis of a vehicle position that would be obtained if the vehicle ahead is assumed to be detected from a position of the headlamp.

14. The light distribution control device for a vehicular headlamp according to claim 12, wherein:
    the headlamp includes a right headlamp disposed at right position of the vehicle and a left headlamp disposed at left position of the vehicle;
    for the right headlamp, the light distribution controller performs a light distribution control on the basis of the detected vehicle position for illumination regions on the right of the non-illuminated region and performs a light distribution control on the basis of a vehicle position that is corrected for a parallax angle for illumination regions on the left of the non-illuminated region; and
    for the left headlamp, the light distribution controller performs a light distribution control on the basis of the detected vehicle position for illumination regions on the left of the non-illuminated region and performs a light distribution control on the basis of a vehicle position that is corrected for a parallax angle for illumination regions on the right of the non-illuminated region.

15. The light distribution control device for a vehicular headlamp according to claim 14, wherein:
    for the right headlamp, the left-side illumination regions are subjected to a light distribution control with a non-illuminated region that is expanded leftward from the non-illuminated region of the light distribution control formed on the basis of the detected vehicle position; and
    for the left headlamp, the right-side illumination regions are subjected to a light distribution control with a non-illuminated region that is expanded rightward from the non-illuminated region of the light distribution control formed on the basis of the detected vehicle position.

16. The light distribution control device for a vehicular headlamp according to claim 12, wherein:
    the headlamp is configured so as to form a prescribed light distribution pattern by combining plural illumination regions that are illuminated by plural respective light sources; and
    the light distribution controller is configured so as to control the non-illuminated region and the inside illumination regions and the outside illumination regions in the vehicle width direction by illuminating or not illuminating the plural illumination regions selectively.

* * * * *